United States Patent
Azmudeh

(10) Patent No.: US 10,167,846 B2
(45) Date of Patent: Jan. 1, 2019

(54) EDUCTION INDUSTRIAL POWER SYSTEM

(71) Applicant: US WIND TECHNOLOGY LLC, Palm Beach, FL (US)

(72) Inventor: Manucher Azmudeh, Palm Beach, FL (US)

(73) Assignee: US Wind Technology LLC, Palm Beach, FL (US)

(*) Notice: Subject to any disclaimer, the term of this patent is extended or adjusted under 35 U.S.C. 154(b) by 0 days.

(21) Appl. No.: 15/355,893

(22) Filed: Nov. 18, 2016

(65) Prior Publication Data
US 2018/0142672 A1    May 24, 2018

(51) Int. Cl.
| | |
|---|---|
| *F03D 3/04* | (2006.01) |
| *F03D 9/25* | (2016.01) |
| *F03D 3/00* | (2006.01) |
| *F03D 9/00* | (2016.01) |
| *H02K 7/18* | (2006.01) |

(52) U.S. Cl.
CPC ............ *F03D 3/0427* (2013.01); *F03D 3/005* (2013.01); *F03D 9/003* (2013.01); *F03D 9/25* (2016.05); *F05B 2220/706* (2013.01); *F05B 2220/7068* (2013.01); *H02K 7/183* (2013.01); *Y02E 10/74* (2013.01)

(58) Field of Classification Search
USPC ...................................................... 290/44, 55
See application file for complete search history.

(56) References Cited

U.S. PATENT DOCUMENTS

| | | | | |
|---|---|---|---|---|
| 2,431,111 A | * | 11/1947 | Du Brie ................. | F03D 3/065 |
| | | | | 290/55 |
| 4,079,264 A | * | 3/1978 | Cohen ...................... | F03D 1/04 |
| | | | | 290/44 |
| 4,134,707 A | * | 1/1979 | Ewers ...................... | F03D 3/02 |
| | | | | 290/55 |
| 4,236,866 A | | 12/1980 | Zapata Martinez | |

(Continued)

FOREIGN PATENT DOCUMENTS

| | | |
|---|---|---|
| CN | 1818377 A | 4/2010 |
| EP | 2740931 A1 | 6/2014 |

OTHER PUBLICATIONS

Ming Cheng, et al.; "The state of the art of wind energy conversion systems and technologies"; Energy Conversion and Management 88 (2014) pp. 332-347; Elsevier Ltd.; Southeast University, Nanjing 210096, China.

(Continued)

*Primary Examiner* — Pedro J Cuevas
(74) *Attorney, Agent, or Firm* — Laurence A. Greenberg; Werner H. Stemer; Ralph E. Locher

(57) ABSTRACT

An eduction industrial power system is provided. The system includes one or more vertical-axis wind turbine power plants. Wind is accelerated through a multi-floor eductor of the power plant. Each floor of the eductor is configured with a constricted portion designed to increase the air speed through the eductor, such that low speed winds enter the eductor and much higher speed winds exit it. A plurality of rotor-blade assemblies disposed in the constricted portion of each floor of the multi-floor eductor are mounted to, and rotate, a shared vertical-axis rotor shaft to generate electricity, via a generator. The electricity generated can be stored, used or channeled to an electrical grid, as desired.

21 Claims, 20 Drawing Sheets

(56) References Cited

U.S. PATENT DOCUMENTS

| | | | | | |
|---|---|---|---|---|---|
| 4,245,958 | A * | 1/1981 | Ewers | | F03D 7/06 |
| | | | | | 415/907 |
| 4,291,233 | A | 9/1981 | Kirschbaum | | |
| 4,321,005 | A * | 3/1982 | Black | | F03D 3/02 |
| | | | | | 415/123 |
| 4,365,929 | A * | 12/1982 | Retz | | F03D 3/04 |
| | | | | | 415/187 |
| 4,486,143 | A * | 12/1984 | McVey | | F03D 3/0427 |
| | | | | | 415/162 |
| 4,551,631 | A * | 11/1985 | Trigilio | | F03D 3/0409 |
| | | | | | 290/1 R |
| 5,057,696 | A * | 10/1991 | Thomas | | F03D 3/02 |
| | | | | | 290/44 |
| 5,332,925 | A * | 7/1994 | Thomas | | F03D 3/02 |
| | | | | | 290/44 |
| 6,036,443 | A * | 3/2000 | Gorlov | | F03B 3/00 |
| | | | | | 415/53.1 |
| 6,179,563 | B1 * | 1/2001 | Minchey | | F03D 3/067 |
| | | | | | 415/4.2 |
| 6,856,042 | B1 | 2/2005 | Kubota | | |
| 6,870,280 | B2 * | 3/2005 | Pechler | | F03D 3/0427 |
| | | | | | 290/44 |
| 7,259,472 | B2 | 8/2007 | Miyake et al. | | |
| 7,425,776 | B2 * | 9/2008 | Ketcham | | F03D 3/005 |
| | | | | | 290/44 |
| 7,794,205 | B1 | 9/2010 | Lowe-Wylde | | |
| 7,875,990 | B2 | 1/2011 | Wang et al. | | |
| 7,948,110 | B2 | 5/2011 | Morgan et al. | | |
| 8,134,252 | B2 | 3/2012 | Pagliasotti | | |
| 8,197,178 | B1 * | 6/2012 | Chen | | F03D 3/0427 |
| | | | | | 290/55 |
| 8,253,266 | B2 * | 8/2012 | Elliott | | F03D 3/02 |
| | | | | | 290/44 |
| 8,314,508 | B2 * | 11/2012 | Kawas | | F03D 3/0418 |
| | | | | | 290/44 |
| 8,322,992 | B2 * | 12/2012 | Fuller | | F03D 3/02 |
| | | | | | 29/889.7 |
| 8,362,637 | B2 * | 1/2013 | Kawas | | F03D 3/0418 |
| | | | | | 290/44 |
| 8,400,008 | B2 * | 3/2013 | Gyorgyi | | F03D 3/005 |
| | | | | | 290/55 |
| 8,459,949 | B2 * | 6/2013 | Lee | | F03D 3/02 |
| | | | | | 415/4.2 |
| 8,552,580 | B2 * | 10/2013 | Tackett | | F03D 1/04 |
| | | | | | 290/54 |
| 8,650,814 | B2 | 2/2014 | Halamka | | |
| 8,668,433 | B2 * | 3/2014 | Friesth | | F03D 1/025 |
| | | | | | 290/55 |
| 8,729,726 | B2 * | 5/2014 | Hassan | | F03D 9/007 |
| | | | | | 290/55 |
| 8,779,616 | B2 | 7/2014 | Morgan et al. | | |
| 8,931,235 | B2 * | 1/2015 | Baker | | F03D 1/001 |
| | | | | | 52/299 |
| 8,950,127 | B2 * | 2/2015 | Yakoub | | F03D 9/19 |
| | | | | | 290/54 |
| 9,127,646 | B2 * | 9/2015 | Cory | | F03D 1/04 |
| 9,689,372 | B2 * | 6/2017 | Gonzalez | | F03D 3/005 |
| 9,835,133 | B2 * | 12/2017 | Al-Garni | | F03D 3/005 |
| 9,890,768 | B2 * | 2/2018 | Ghosh | | F03D 3/005 |
| 2003/0209911 | A1 * | 11/2003 | Pechler | | F03D 3/0427 |
| | | | | | 290/55 |
| 2007/0224029 | A1 | 9/2007 | Yokoi | | |
| 2009/0015015 | A1 | 1/2009 | Joutsiniemi | | |
| 2009/0238676 | A1 * | 9/2009 | Marvin | | F03D 1/04 |
| | | | | | 415/4.3 |
| 2010/0109337 | A1 * | 5/2010 | Wang | | F03D 3/067 |
| | | | | | 290/55 |
| 2010/0171314 | A1 * | 7/2010 | Tackett | | F03D 1/04 |
| | | | | | 290/55 |
| 2010/0181779 | A1 * | 7/2010 | Elliott | | F03D 3/02 |
| | | | | | 290/55 |
| 2010/0296928 | A1 * | 11/2010 | Falcone | | E04C 2/20 |
| | | | | | 416/120 |
| 2010/0308597 | A1 * | 12/2010 | Gyorgyi | | F03D 3/005 |
| | | | | | 290/55 |
| 2010/0322770 | A1 | 12/2010 | Sheinman | | |
| 2011/0089699 | A1 | 4/2011 | Bernhoff | | |
| 2011/0140450 | A1 * | 6/2011 | Kawas | | F03D 3/0418 |
| | | | | | 290/55 |
| 2011/0221196 | A1 * | 9/2011 | Kawas | | F03D 3/0418 |
| | | | | | 290/44 |
| 2013/0093191 | A1 | 4/2013 | Janowski | | |
| 2014/0010654 | A1 | 1/2014 | Fajardo et al. | | |
| 2014/0097082 | A1 | 4/2014 | Roza | | |
| 2014/0103663 | A1 * | 4/2014 | Hassan | | F03D 9/007 |
| | | | | | 290/55 |
| 2014/0205462 | A1 | 7/2014 | Gochev | | |
| 2015/0084341 | A1 * | 3/2015 | Berry | | F03D 9/002 |
| | | | | | 290/55 |
| 2015/0167636 | A1 * | 6/2015 | Al-Garni | | F03D 3/0427 |
| | | | | | 307/72 |
| 2016/0025067 | A1 * | 1/2016 | Pristash | | F03D 9/007 |
| | | | | | 290/55 |
| 2018/0100483 | A1 * | 4/2018 | Tutunaru | | F03D 3/0463 |
| 2018/0135599 | A1 * | 5/2018 | Baxter, Jr. | | F03D 7/06 |

OTHER PUBLICATIONS

John F. Mandell, et al.; "Composite materials fatigue issues in wind turbine blade construction"; pp. 1-25; Montana State University; Bozeman, MT.

F. Guerrero-Villar, et al.; "Development of Vertical Wind Turbines via FDM Prototypes"; Procedia Engineering 132 (2015); pp. 78-85; Elsevier Ltd; sciencedirect.com.

Ryan Cowgill, et al.; "Wind Turbine Rotor Design"; 2006; ME480 Senior Design Project, Boise State University College of Engineering.

Peter Schubel, et al.; "Wind Turbine Blade Design"; Energies 2012, 5, pp. 3425-3449, www.mdpi.com/journal/energies.

Durga Gautam, et al.; "Impact of Increased Penetration of DFIG-Based Wind Turbine Generators on Transient and Small Signal Stability of Power Systems"; IEEE Transactions on Power Systems; vol. 24, No. 3; Aug. 2009.

Fernando D. Bianchi et al.; "Wind Turbine Control Systems—Principles, Modelling and Gain Scheduling Design"; 2007; sisis.rz.htw-berlin.de.

Kelvin Tan, et al; "Optimum Control Strategies in Energy Conversion of PMSG Wind Turbine System Without Mechanical Sensors"; IEEE Transactions on Energy Conversion; vol. 19, No. 2, Jun. 2004; ieeexplore.ieee.org.

Monica Chinchilla, et al; "Control of Permanent-Magnet Generators Applied to Variable-Speed Wind-Energy Systems Connected to the Grid"; IEEE Transactions on Energy Conversion; vol. 21, No. 1; Mar. 2006 ieeexplore.ieee.org.

Ruben Pena, et al; "Overview of Control Systems for the Operation of DFIGs in Wind Energy Applications"; IEEE Transactions on Insustrial; 2013; infona.pl.

Arantxa Tapia, et al; "Modeling and Control of a Wind Turbine Driven Doubly Fed Induction Generator"; IEEE Transactions on Energy Conversion; vol. 18, No. 2, Jun. 2003; ieeexplore.ieee.org.

S. M. Muyeen, et al; "A Variable Speed Wind Turbine Control Strategy to Meet Wind Farm Grid Code Requirements"; IEEE Transactions on Power Systems; vol. 25, No. 1; Feb. 2010; ieeexplore.ieee.org.

Deng Ju-Long; "Control problems of grey systems"; System and Control Letters; vol. 1. No. 5; Mar. 1982, Elsevier.

Janaka Ekanayake, et al; "Comparison of the Response of Doubly Fed and Fixed-Speed Induction Generator Wind Turbines to Changes in Network Frequency"; IEEE Transactions on Energy Conversion; vol. 19, No. 4, Dec. 2004; ieeexplore.ieee.org.

P. M. Anderson, et al; "Stability Simulation of Wind Turbine Systems"; IEEE Transactions on Power Apparatus and Systems; vol. PAS-102, No. 12, Dec. 1983; ieeexplore.ieee.org, Power Math Associates, Inc.; Tempe, AZ.

(56) References Cited

OTHER PUBLICATIONS

Awea; "Wind rush" underway across much of America; Mar. 31, 2015 http://www.awea.org/MediaCenter/pressrelease.aspx?ItemNumber=7374.

NRDC; "Advances in Wind Power Technology Mean Incredible Opportunities for Clean Energy Across ALL Regions"; Jul. 2015; https://www.nrdc.org/sites/default/files/wind-power-technology-IB.pdf.

Stephen C. Nolet; "Composite Wind Blade Engineering and Manufacturing"; TPI Composites, Jan. 20, 2011, Warren, Rhode Island; http://web.mit.edu/windenergy/windweek/Presentations/Nolet_Blades.pdfInc.

Dayton A. Griffin; "Blade System Design Studies vol. I: Composite Technologies for Large Wind Turbine Blades"; SAND2002-1879 Unlimited Release, Printed Jul. 2002; http://windpower.sandia.gov/other/021879.pdf; Global Energy Concepts, LLC; Kirkland, WA.

John Timmer; "The technical advances that could make wind power viable everywhere"; Chasing Brilliance Jan. 2015; http://arstechnica.com/science/2015/06/making-wind-power-work-even-in-low-wind-locations/.

Department of Energy; "Next-Generation Wind Technology"; Search Energy.gov http://energy.gov/eere/next-generation-wind-technology.

Power Engineering; "Advancements in Wind Turbine Technology: Improving Efficiency and Reducing Cost"; Mar. 14, 2014; http://www.power-eng.com/articles/print/volume-118/issue-3/features/advancements-in-wind-turbine-technology-improving-efficiency-and-reducing-cost.htm.

Danny Sale, et al; "Structural Design of Composite Blades for Wind and Hydrokinetic Turbines"; Feb. 13, 2012, University of Washington; https://depts.washington.edu/nnmrec/docs/20120213_SaleD_pres_StructuralDesign.pdf.

Wind Power Generation, Mitsubishi Heavy Industries, Ltd., Global Website; "What is wind power generation?" https://www.mhi-global.com/discover/earth/technology/wind_power.html.

Ahmed Y. Qasim, et al; "Investagation and design impeller type vertical axis wind turbine"; Australian Journal of Basic and Applied Sciences; Dec. 2011; https://www.researchgate.net/publication/236960900_Investagation_and_design_impeller_type_vertical_axis_wind_turbine.

Wind Turbine Rotor Design Issues; "Assessment of Research Needs for Wind Turbine Rotor Materials Technology"; p. 72; 1991; National Academy Press; http://www.nap.edu/read/1824/chapter/6#72.

Bloomberg News; "China's Idled Wind Farms May Spell Trouble for Renewable Energy"; Jun. 28, 2016; http://www.bloomberg.com/news/articles/2016-06-28/trouble-in-renewable-energy-spotted-in-china-s-idled-wind-farms.

Monaco Catello Raffaele Filippo; "The Power Plant of the Future" wind closable Towerdome, Italian patent n. 0001417552, May 15, 2013; http://lino-monaco.com/ 1.

Oea—Creative Solutions for Improving your World: "OEA International's Wind and Water Turbine Business"; OEA International, Inc.; 2012; http://www.oea.com/energy/home 1.

Michael Barnard; "Vertical Axis Wind Turnines: Great in 1890, Also-rans in 2014"; Clean Technica; Apr. 7, 2014 http://cleantechnica.com/2014/04/07/verticalaxiswindturbinesgreat1890alsorans2014/.

REM Enterprises, Inc.; "Wind Technology—Wind Turbines"; 2006; Portland, OR; http://remnet.com/Wind%20Energy/page5.html.

Mahesh Basantani, "The MAGLEV: The Super-powered Magnetic Wind Turbine"; Nov. 26, 2007 under Environment, Renewable Energy, Wind Power, http://inhabitat.com/super-powered-magnetic-wind-turbine-maglev/.

FRB Blades for wind generator, vertical axis wind turbine blades, horizontal wind turbine blades; http://alibaba.com/product-detail/FBR-Blades-for-wind-generator-vertical_60299548913.html.

Lisa Merolla; "10 Wind Turbines That Push the Limits of Design"; Dec. 17, 2009 http://www.popularmechanics.com/science/energy/a4428/4324331/.

Learn Engineering; "Wind Turbine Design"; http://www.learnengineering.org/2013/08/Wind-Turbine-Design.html.

We Handbook—2—Aerodynamics and Loads; "Wind Turbine Blade Aerodynamics"; http://www.gurit.com/files/documents/2aerodynamicspdf.pdf.

Nicolas W. Miller, et al; "Dynamic Modeling of GE 1.5 and 3.6 Wind Turbine-Generators"; GE Power Systems Energy Consulting; Oct. 27, 2003, Version 3.0; http://faculty.mu.edu.sa/public/uploads/1338184770.6024modeling.pdf.

Siemens; "The right Siemens wind turbine for all conditions" Product Porfolio, www.energy.siemens.com/hq/en/renewable-energy/wind-power/platforms/.

* cited by examiner

EDUCTION INDUSTRIAL POWER SYSTEM

BACKGROUND OF THE INVENTION

Field of the Invention

The present invention relates to a power system, and more particularly, to a power system utilizing a multi-blade, vertical axis wind turbine.

Description of the Related Art

Windmills have been used to generate power for hundreds of years. The first windmills were developed to automate the tasks of grain-grinding and water-pumping. The earliest-known design of a windmill was a vertical-axis wind turbine (VAWT) system developed in Persia about 500-900 A.D. Subsequently, the windmill spread from Persia to the surrounding areas in the Middle East Delta and to Europe, where the Dutch introduced the first horizontal-axis wind turbine (HAWT). In the 1800s, windmills were additionally being used for the generation of electricity. By 2012, wind energy powered an estimated 15 million homes in the United States of America, and became the primary source of renewable electricity.

More recently, dozens of innovators have tried various models of wind turbines, all but a few based on the Dutch horizontal axis grinding mills. One designer after another has copied the horizontal system trying to adapt them to a vertical axis system. Vertical-axis designers, instead of innovating blade systems fitting this system, became entangled with drag and lift aspects of HAWT blade systems, trying to adapt them to vertical axis configuration. In recent decades, two VAWT designs were tried: Savonius wind turbines; and Darrieus wind turbines.

Savonius wind turbines utilize of a number of aerofoils vertically mounted on a rotating shaft or framework. However, it can only use drag and, therefore, cannot harvest sufficient wind energy.

Darrieus wind turbines utilize a number of curved aerofoil blades mounted on a vertical rotating shaft or framework. However, the use of Darrieus wind turbines have lagged behind in real-world energy production, due to design challenges and limitations.

Neither of the Darrieus or Savonius wind turbines, nor other similar designs, have led to an acceptable efficiency and practicality level required for commercial power production. Vertical axis units tried in high-rise buildings reflected in some recent patents have not resulted in a promising as they have not been able to supply the building power needs alone. Lately a well-financed team with ample budget tried to adopt the best of available techniques of this kind to a high rise in Bahrain, only to disappointing results reflected in a report to the CTBUH 2010 World conference in Mumbai, entitled "Large Scale Building-integrated Wind Turbines".

It is interesting to note historically how windmill/wind turbine technology took a wrong turn to end up where it is today. In 1919 the physicist Albert Betz of Germany showed that no more than 59.3% of the kinetic energy of the wind forcing on blades of a HAWT could be captured. This sets a serious limit on HAWT systems. Despite this, designers continued to copy the old Dutch horizontal shaped blades, which has led to today's super-sized inefficient systems which, despite subsidies, barely produce profitable commercial power. HAWT's became the mainstream technology. Producers, instead of working on innovative technology to solve the wind speed problem, worked around it by resorting to supersized towers and blades.

Presently 1.5 to 2 million dollars per MW installed HAWT systems with production cost of roughly $64-95/MWh. The federal production tax credit (PTC) currently provides 2.2 cents for every kilowatt-hour of a privately owned wind turbine's production for ten years. At the federal level, the production or investment tax credit and double-declining accelerated depreciation can pay for two-thirds of a wind power project. Additional state incentives, such as guaranteed markets and exemption from property taxes, can pay for another 10%. In California, in 2014, wind farms generated 13.7 TWh from 6,200 MW of installed capacity. This results in a fleet-wide yield of 2,200 kWh/kW/yr.

Despite subsidies and tax credits less than 5% of US energy is produced by wind and 95% through burning coal, fossil fuel, etc. This is, in part, because:

1. The wind industry having HAWT turbine as its main means of energy production has a very low capacity credit, its ability to replace other power sources. In UK, which is the windiest country in Europe, with 25,000 MW of wind power has a capacity credit of only 16%, while credit capacity in Germany is 14%, and 10% for New York State.

2. Industry estimates project an annual output of 30-40%, but real-world experience shows that annual outputs of 15-30% of capacity are more typical.

3. The centrifugal force on the spinning blades increases as the square of the rotation speed. This makes horizontal axis structure sensitive to over-speed. Therefore, the degree of backup is much higher than design of this invention. According to Eon Netz, one of four major German grids, back-up requirements for German wind-operators has been in excess of 80%. This amounts to excessive capital requirement.

4. Taller masts and blades are more difficult and costly to transport and install. Transportation and installation can now cost 20% of equipment costs.

5. Units have to be placed where sufficient wind flow exists. Instead of adopting innovative technologies developers resorted to go to high altitudes. They had to place a 56-ton nacelle, 135 tons of blade assembly on 76 tons of tower (total of 267 tons), installing on 1000 tons of concrete to produce 1.5 nominal MW of power, yielding substantially lower real power at user or transmission end.

6. HAWT units have to operate in a rather narrow range of wind speed. Most are not productive at speeds below 15 MPH and have to be shut down at speeds approaching 50 MPH.

7. At least 10 acres per MW of land is required. They had been installed only where there is a wind speed of 15 MPH. Noise and environmental problems exerted further limitations on location selection.

8. HAWT require an additional yaw control mechanism to turn the blades toward the wind. When the turbine turns to face the wind, the rotating blades act like a gyroscope. This cyclic twisting can quickly fatigue and crack the blade roots, hub and axle of the turbines.

9. Except for few gearless designs, most HAWT systems engage a gearbox, which adds to serious maintenance problems in severe cold weather conditions, as well as costs for stronger towers in which to place gears and generators at high elevations.

10. To avoid buckling, doubling the tower height generally requires doubling the diameter of the tower as well, increasing the amount of material by a factor of at least four.

Maintenance record statistics field survey indicate that one out of each 150 blades breaks under cyclic fatigue.

11. Reflections from tall HAWTs may affect side lobes of radar installations creating signal clutter.

12. Constant change in the degree of blade pitch on these turbines is the cause of audible noise on the wind farms. Furthermore mast height makes them obtrusively visible across large areas disrupting the appearance of the landscape, environmental problems which has put major limitations for locating wind farms.

13. Finally, the most important factor is that, due to the fact that HAWT systems have grown in size and elevation to their limits, they do not have much room to go in size and elevation to be economically viable.

What is needed is a vertical axis wind turbine has an acceptable efficiency and practicality level for use in commercial power production.

BRIEF SUMMARY OF THE INVENTION

The present invention is particularly suited to overcome those problems which remain in the art in a manner not previously known or contemplated. It is accordingly an object of the invention to provide an eduction industrial power system including one or more vertical-axis wind turbine power plants. Wind is accelerated through a multi-floor eductor of the power plant. In one particular embodiment, each floor of the eductor is configured with a constricted portion designed to increase the air speed through the eductor, such that low speed winds enter the eductor and much higher speed winds exit it. In this embodiment, a plurality of rotor-blade assemblies are disposed in the constricted portion of each floor of the multi-floor eductor, and are mounted to, and rotate, a shared vertical-axis rotor shaft. Rotation of the shaft generates electricity, via a generator. This electricity can be stored, used or channeled to an electrical grid, as desired.

Although the invention is illustrated and described herein as embodied in an eduction industrial power system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The foregoing background, as well as the following detailed description of the preferred embodiments, is better understood when read in conjunction with the appended drawings. For the purpose of illustrating the invention, there is shown in the drawings an exemplary embodiment that is presently preferred, it being understood however, that the invention is not limited to the specific methods and instrumentality's disclosed. Additionally, like reference numerals represent like items throughout the drawings. In the drawings.

DETAILED DESCRIPTION OF THE INVENTION

Before explaining the disclosed embodiment of the present invention in detail, it is to be understood that the invention is not limited in its application only to the details of the particular arrangement shown since the invention is capable of other embodiments. Also, the terminology used herein is for the purpose of description and not of limitation.

Throughout the history of wind energy development, the greatest hurdle has been the availability and speed of wind. Developers have worked around wind shear, but without tackling it. Wind speed rises proportionally to the seventh root of altitude. Doubling the altitude of a turbine, then, increases the expected wind speeds by only 10% and the expected power by only 34%. Thus, HAWT makers have gone to higher and higher elevations to catch higher wind speed.

The present invention is directed to an eduction system that provides the first revolutionary utilization of a technology for developing a major industrial wind power plant. Air speed can be increased many-fold by adopting an eduction system in accordance with the present invention, wherein low speed air entering a broad inlet exits at much higher speeds from the eductor neck. With flexibility in design for an eduction ratio (L/E) of 10 to 50, the air speed at the turbine can be increased several times. Taming the wind into higher velocities, permits a much wider range of site location. By increasing the wind speed many-fold, and utilizing multiple-stage rotor shafts, gear-less high speed vertical generators, advanced materials and mechanism configurations, eduction industrial power system technology achieves a many-fold increase in efficiency, major cost reduction, ease of operation and maintenance, thus permitting the opening of a new avenue for wind energy to capture a far greater share of energy production in the country.

Referring now to FIGS. 1A-10C, an eduction industrial power plant 100 (See, for example, FIGS. 1A-3B) in accordance with one particular embodiment of the present invention will be described. An eduction industrial power system of the invention utilizes one or more power plants 100, to generate power that can be provided to an AC electrical grid or that can be used as a power source for a local or remote industrial application, as desired.

Figure 1A:
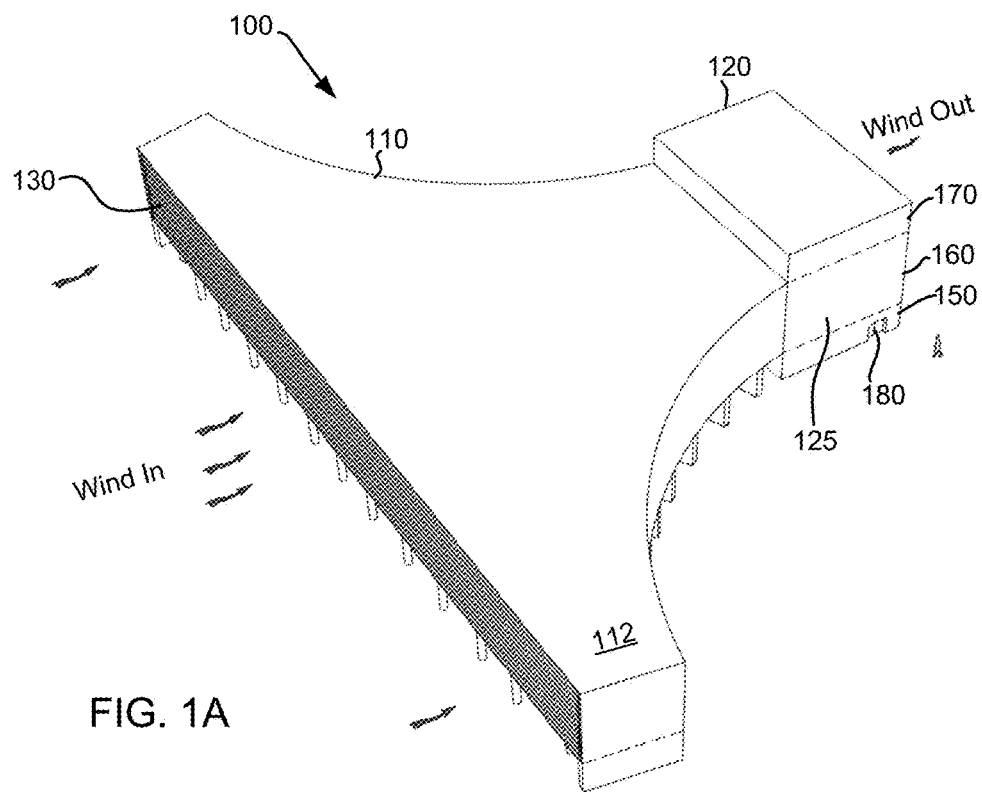
FIGS. 1A and 1B are perspective views taken from the top front and top rear, respectively, of an eduction industrial power plant of an eduction industrial power system in accordance with one particular embodiment of the invention.
Figure 1B:
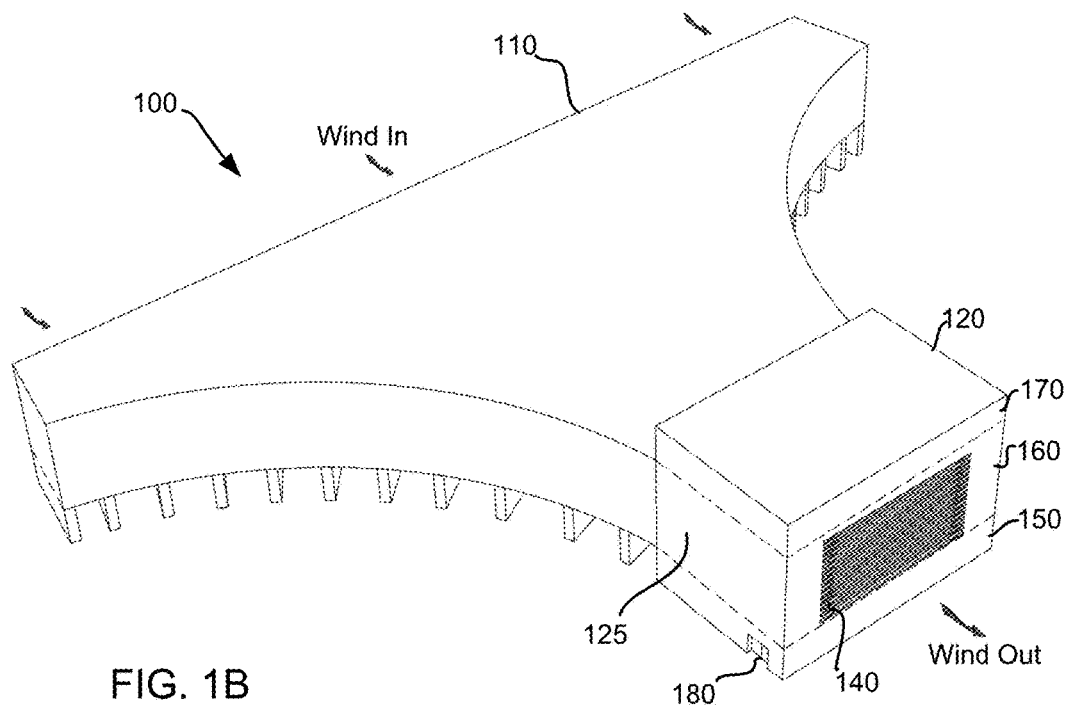
Figure 2A:
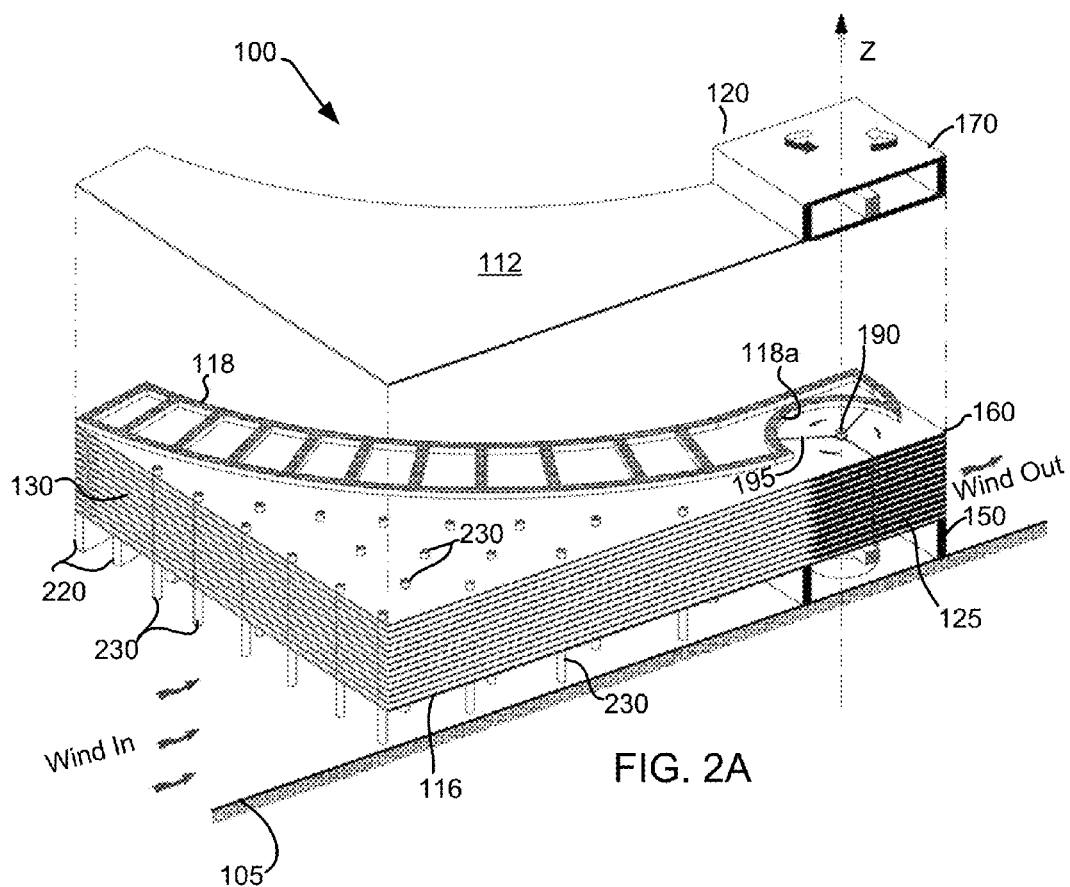
FIG. 2A is a partially exploded, sectional, perspective view of an eduction industrial power plant, viewed from the front (wind intake side), in accordance with one particular embodiment of the invention.
Figure 2B:
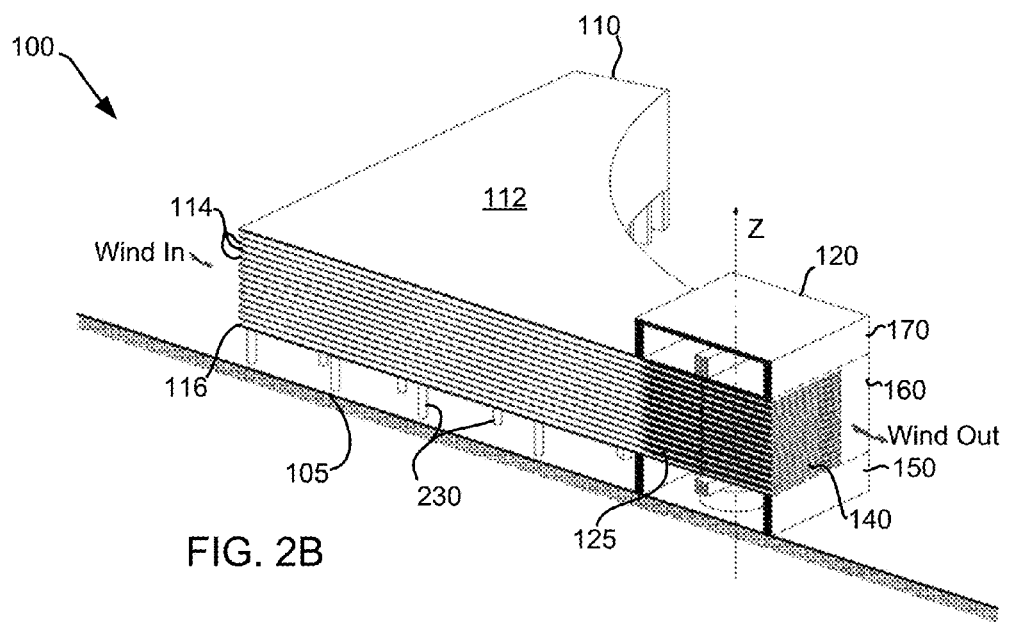
FIG. 2B is a sectional, perspective view of an eduction industrial power plant, viewed from the rear (wind outlet side), in accordance with one particular embodiment of the invention.
Figure 2C:
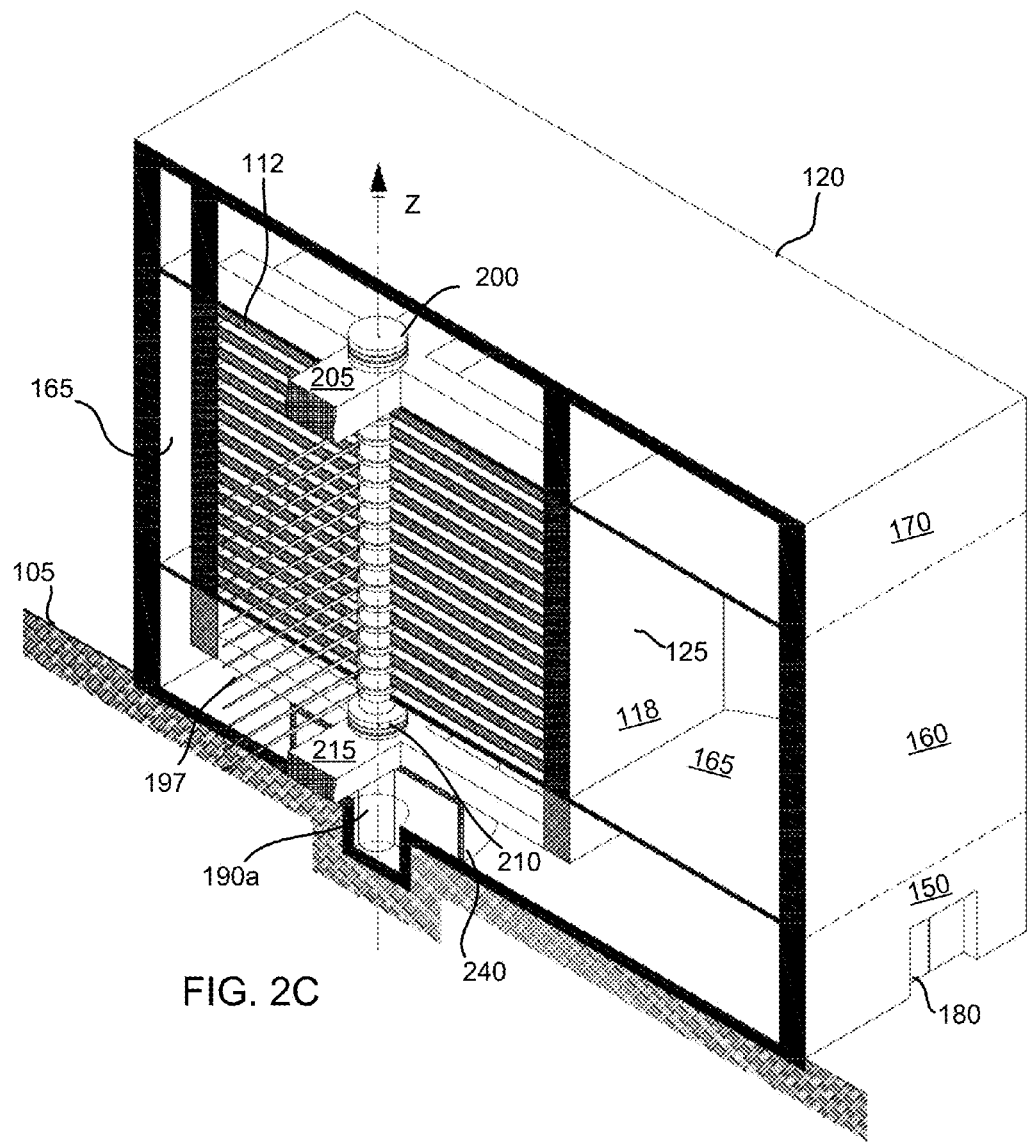
FIG. 2C is a perspective view of a section of the power plant house for an eduction industrial power plant, viewed from the front (wind intake side), in accordance with one particular embodiment of the invention.
Figure 10A:
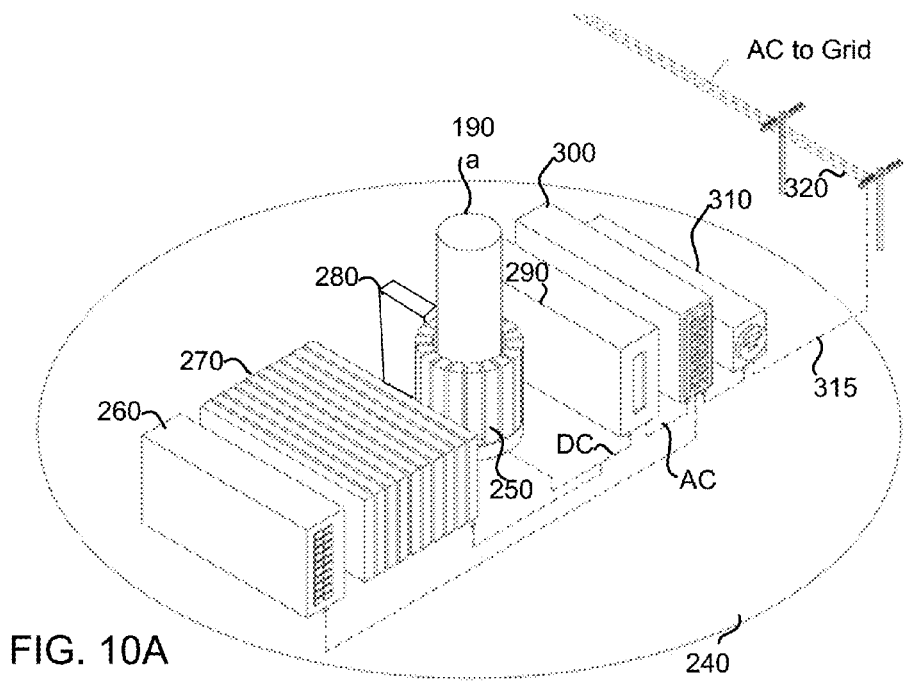
FIG. 10A is a block diagram illustrating the generator and control system of an eduction industrial power plant system, according to one embodiment of the present invention.

The Power Plant:

In one particular embodiment of the invention, the power plant 100 includes a multi-floor eductor 110 (FIGS. 1A, 2A) extending from, and integrated with, a power plant house 120 (FIGS. 1A, 2C). Low speed winds enter the eductor 110 through an air/wind intake 130 (FIG. 1A) and much higher speed winds exit from an air/wind outlet 140 (FIG. 1B). More particularly, in the present embodiment, the eductor 110 is configured to funnel air from the air intake face 130, to and through a constricted neck portion 125 (FIGS. 5A, 5C) of the eductor 110, and out the air outlet 140. With flexibility in design for the eduction ratio (L/E) of 10 to 50, air speed through the eductor 110 can be increased several times. A plurality of rotor-blade assemblies 195 (FIGS. 7A, 7B) disposed at each floor of the multi-floor eductor 120, in the constricted neck portion 125, cause rotation of a shared, vertical-axis main rotor shaft 190 (FIG. 2D), which generates electricity, via a generator 250 (FIG. 10A). The electricity generated can be stored or used, as desired.

The Power Plant House

Figure 2D:
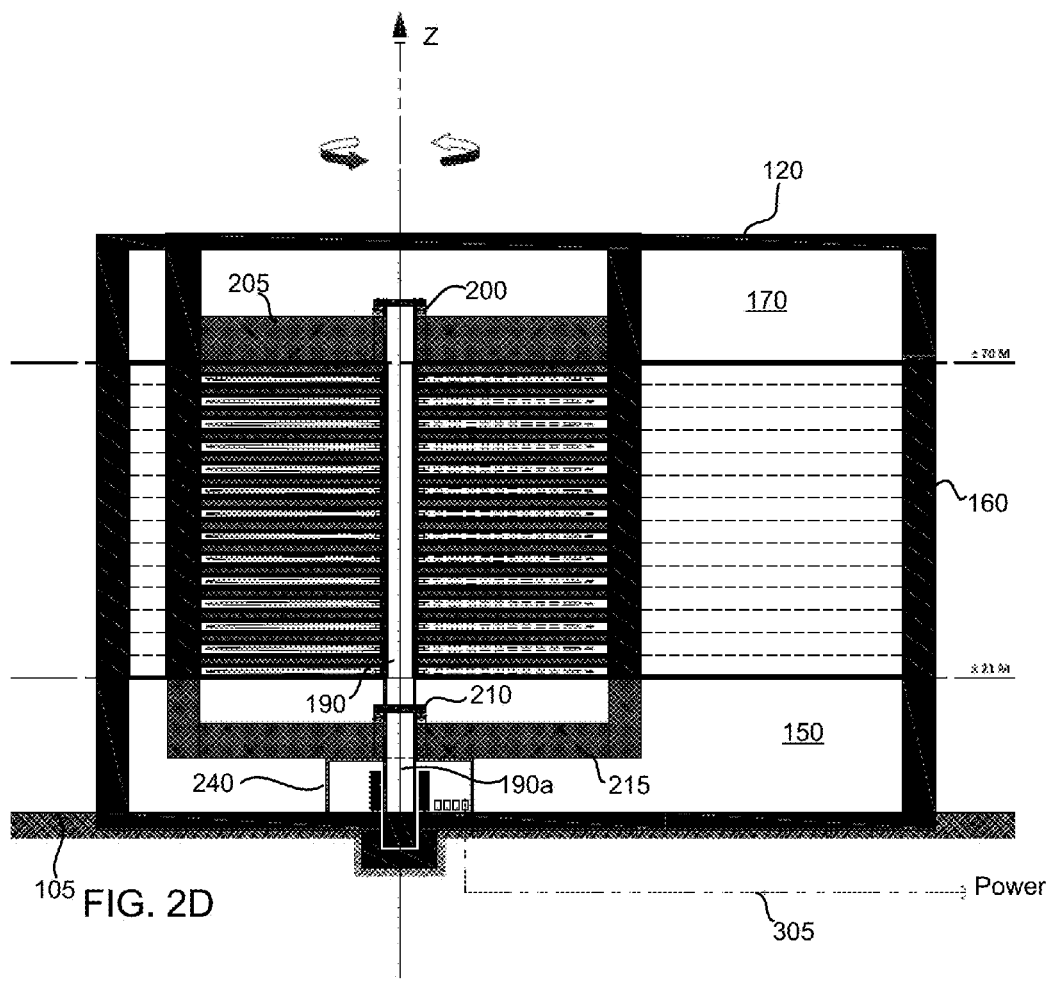
FIG. 2D is a plan view of a section of the power plant house for an eduction industrial power plant, viewed from the front (wind intake side), in accordance with one particular embodiment of the invention.

For purposes of the present description, the power plant house 120 is divided into three levels: 1) the lower bearing house 150 (FIG. 2D); 2) the multi-floor eductor house 160 (FIG. 1B); and 3) the hanging bearing house 170 (FIG. 2D). Additionally, the power plant house 120 includes the vertical, main rotor shaft 190, which is the main rotor shaft of the vertical wind turbine system of the present invention. A plurality of rotor-blade assemblies 195 (FIGS. 7A-7C) are mounted to the vertical, main rotor shaft 190. As will be described more particularly below, in the present preferred embodiment, one rotor-blade assembly 195 is mounted to the shaft 190 in alignment in the space between each two adjacent floors of the multi-floor eductor 120. Generator and control system 230 (FIG. 10C) is additionally provided in the house 120 for controlling the VAWT and the capture of energy therefrom.

In the present preferred embodiment, the power plant house 120 is accessible to users via an entrance 180 (FIG. 1A) in the lower bearing housing part 150. The power plant house 120 includes additional elements including, but not limited to, a vertical circulation shaft 129 (FIG. 3A) provided from the top level 170 to the bottom level 150 of the power plant house 120, to provide vertical circulation through the power plant house 120. Optionally, a roof extension 124 (FIG. 4A), supported by a cable 126 (FIG. 4A), can be provided to shield the wind outlet 140 from rain and snow. In one particular embodiment of the invention, the walls of the house 120 are shear walls.

Figure 3A:
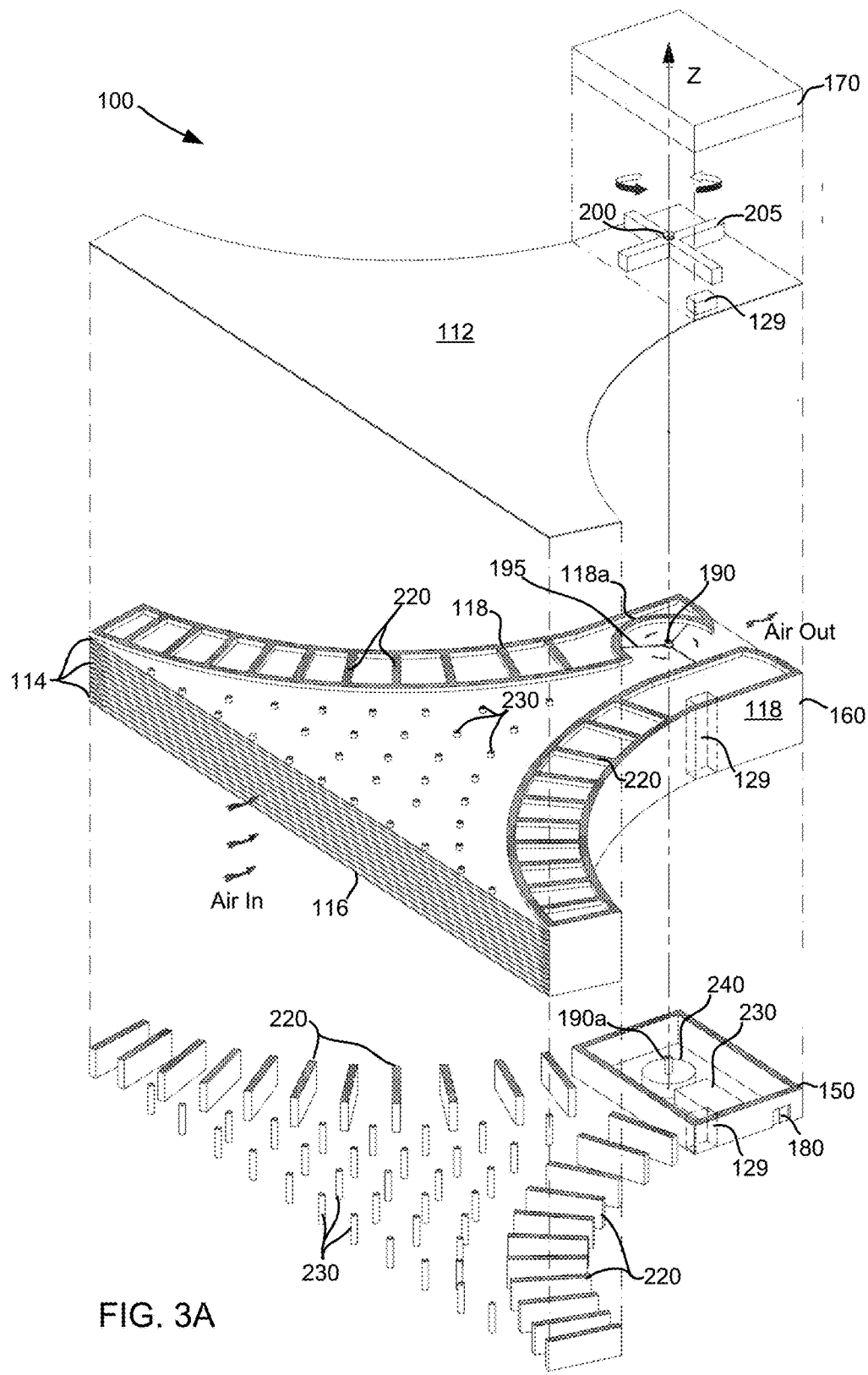
FIG. 3A is an exploded view of an eduction industrial power plant according to one embodiment of the invention.
Figure 3B:
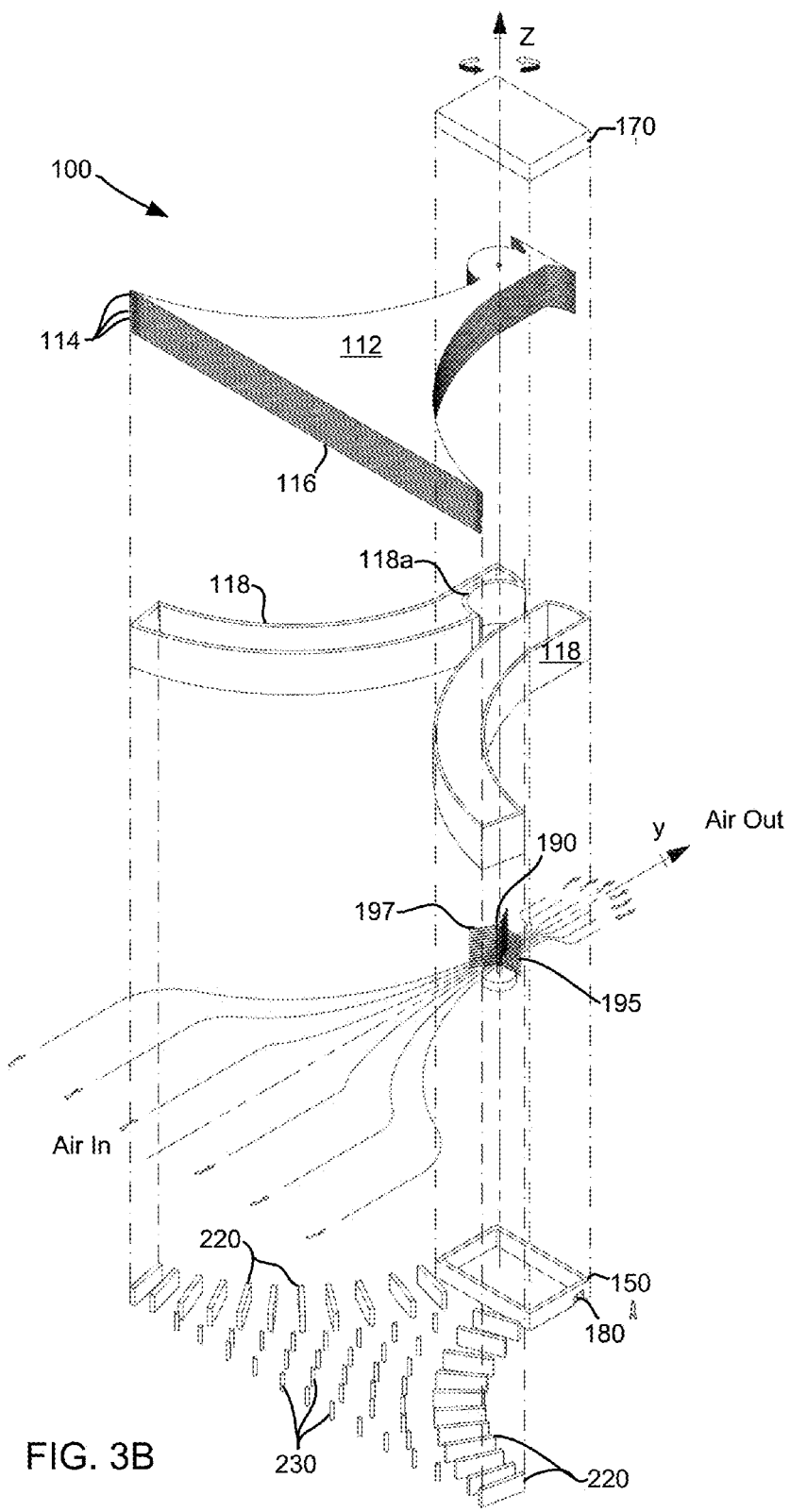
FIG. 3B is a further exploded view of an eduction industrial power plant according to one embodiment of the invention.

The Hanging Bearing House:

The hanging bearing house 170 is the top level of the power plant house 120 and sits above the eductor house 160 and above the eductor roof 112 (FIG. 3A). In one particular embodiment of the invention, the floor of the hanging bearing house 170 is approximately 70 meters above the ground 105 (FIG. 2D). Among other things, the hanging bearing house 170 contains the hanging bearing 200 (FIGS. 2C, 8A) and a structural bearing 205 (FIG. 2C), supporting the hanging bearing 200, for the vertical-axis rotor shaft or main power shaft 190. As illustrated more particularly in FIGS. 8A and 8B, the hanging bearing 200 includes, among other things, a ferrule 201 receiving the vertical-axis power shaft 190 and extending into the structural bearing 205, a ball bearing portion 202 supporting the vertical power shaft 190 and a top 203.

The Main Rotor Shaft and Bearing System:

In the present particular embodiment of the invention, all of rotor-blade assemblies 195 are mounted in the eductor wind channels on the same, common vertical-axis, main rotor shaft 190. The main rotor shaft 190 is, itself, aligned with the vertical-axis "Z" and supported by two bearing systems 200, 210 (FIGS. 2C, 10C), one each at the top and bottom of the rotor shaft 190. In one particular embodiment, each bearing system 200, 210 is the largest of its kind and uses advances in bearing assembly techniques and axial fixation methodology for manufacture and installation of the vertical-axis rotor shaft 190. In one particular embodiment, the main rotor shaft is 2.0 meters in diameter.

To eliminate the influence of positional- and deflection-related errors, and to achieve high load carrying capacity, bearings will be used in a locating/non-locating bearing arrangement. In one particular embodiment, a bearing having self-aligning capability, such as a CARBO toroidal roller bearing by SKF® will be used in the non-locating position, while an axially locating, spherical roller bearing will be used in the locating position. The use of a locating/non-locating bearing arrangement provides a high load-carrying capacity that has the lowest possible bearing and housing weight for a two-bearing arrangement.

Figure 4A:
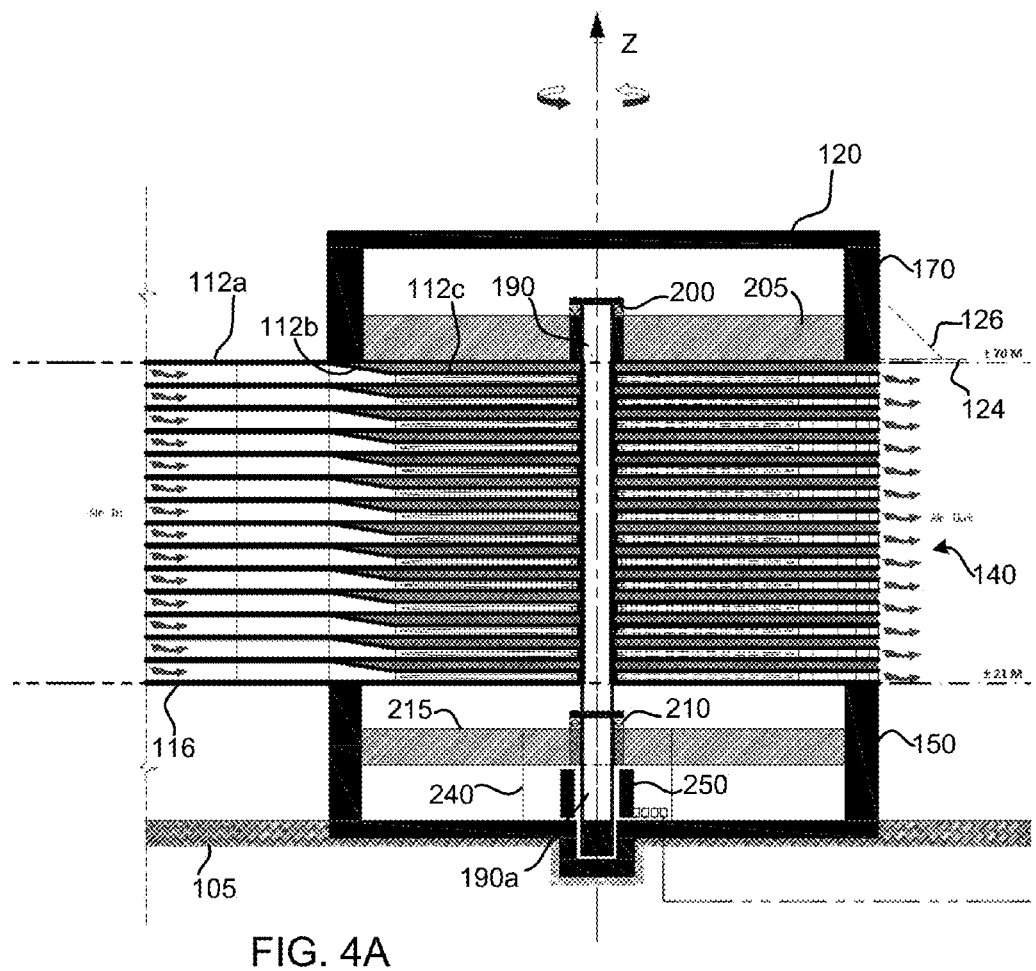
FIG. 4A is a side plan view of a partial section of the power plant house for an eduction industrial power plant, in accordance with one particular embodiment of the invention.
Figure 4B:
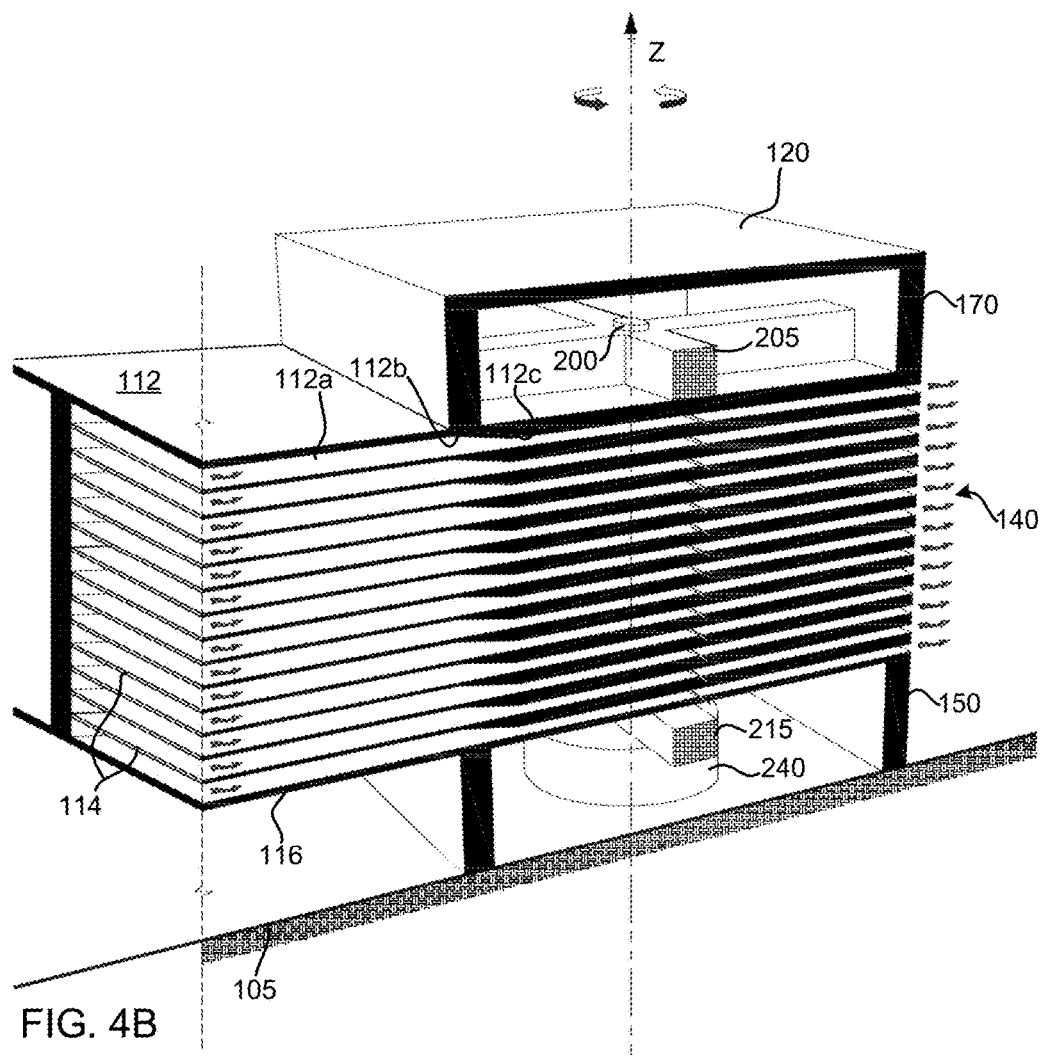
FIG. 4B is a perspective view, viewed from the front, of a partial section of the power plant house for an eduction industrial power plant, in accordance with one particular embodiment of the invention.
Figure 4C:
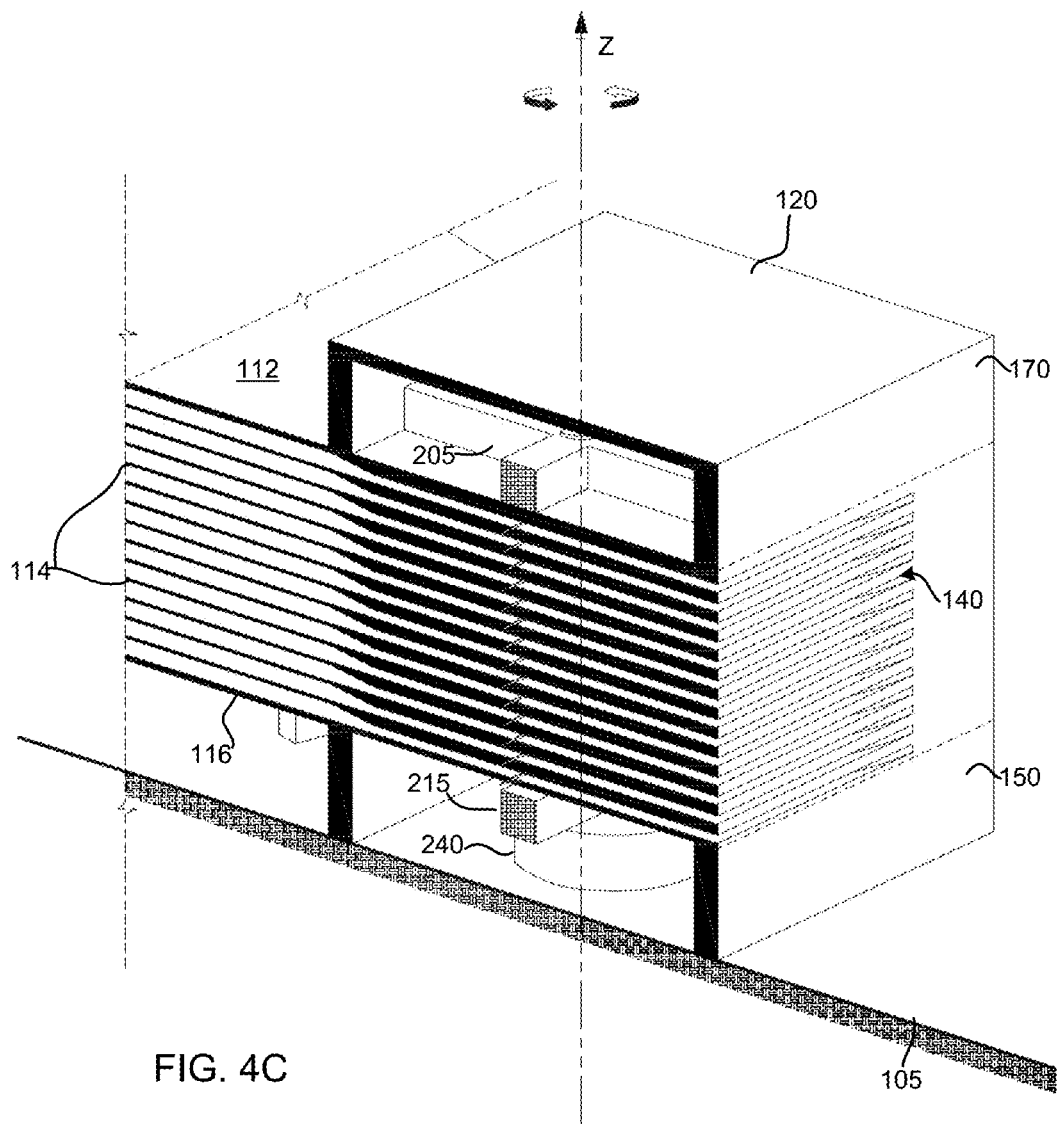
FIG. 4C is a perspective view, viewed from the rear, of a partial section of the power plant house for an eduction industrial power plant, in accordance with one particular embodiment of the invention.
Figure 9A:
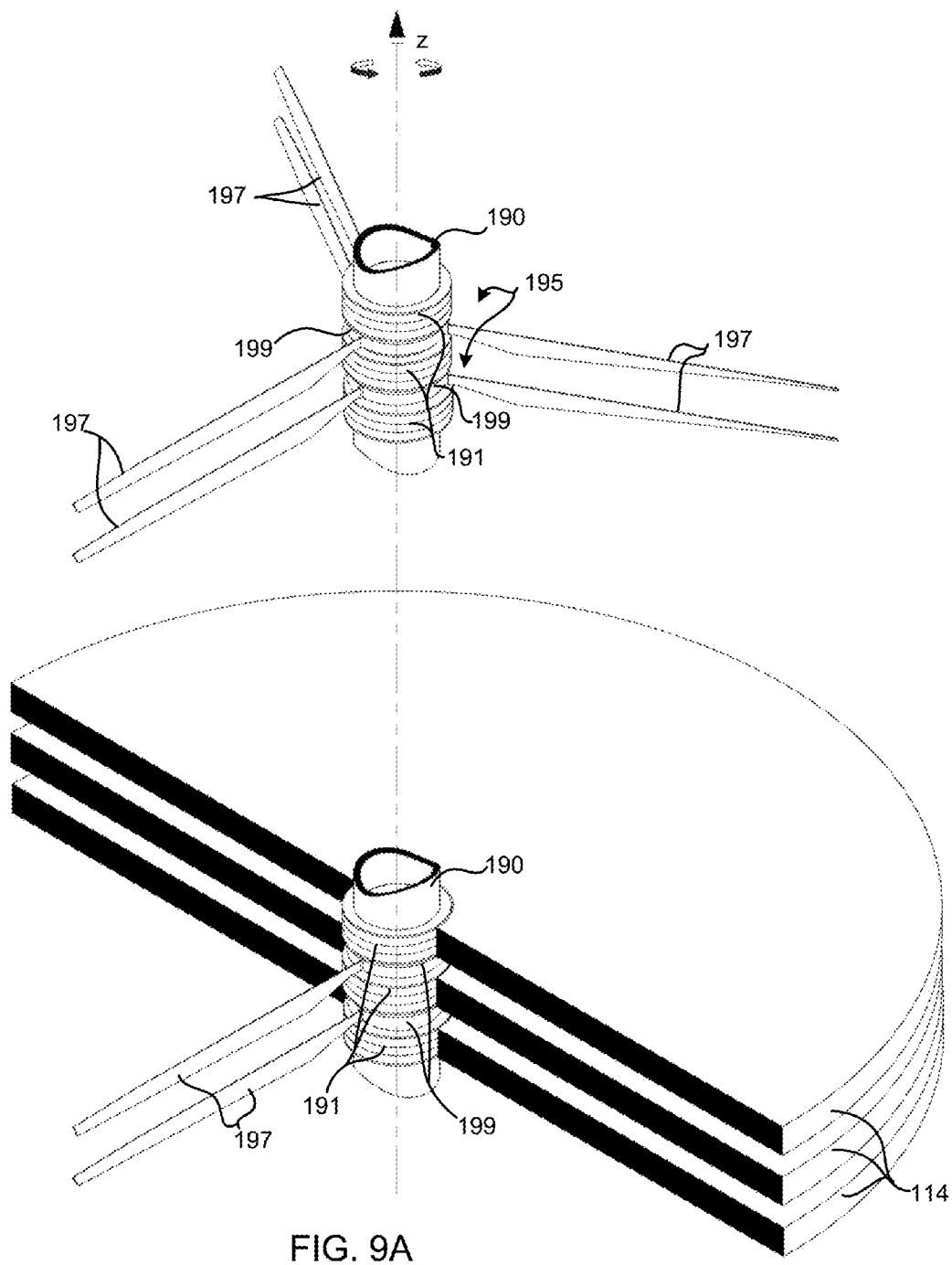
FIG. 9A is a partial, cut-away, perspective view of a portion of the power plant showing the vertical axis rotor shaft and a plurality of rotor assemblies in relation to eductor floors, in accordance with one particular embodiment of the invention.
Figure 9B:
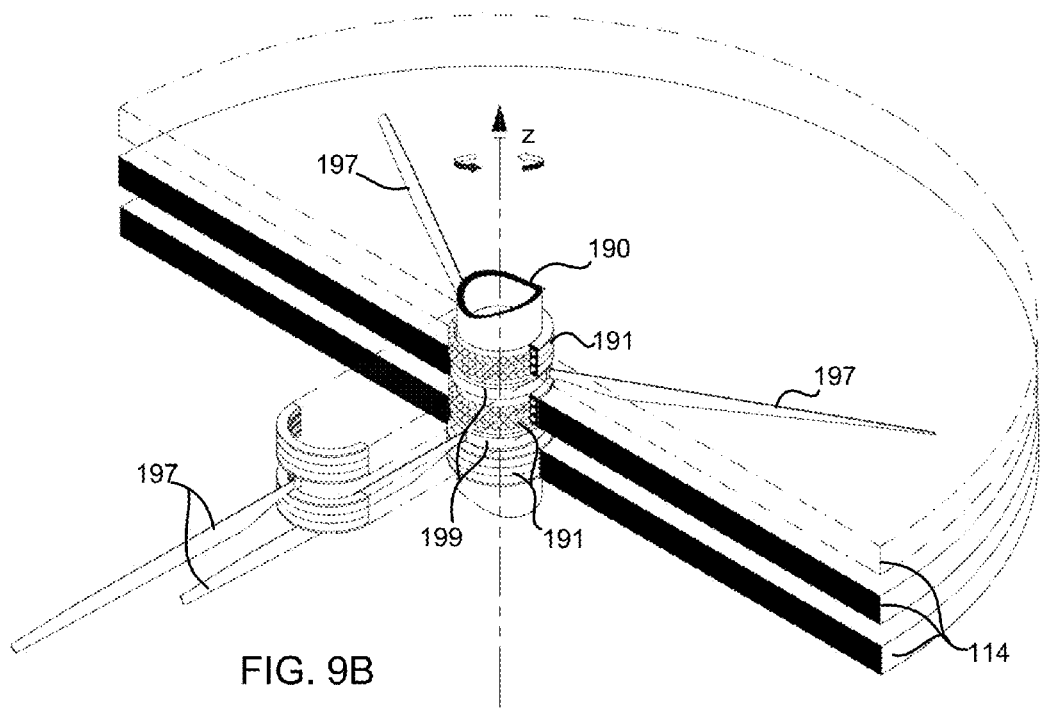
FIG. 9B is a partially exploded, partial, cut-away, perspective view of a portion of the power plant in accordance with one particular embodiment illustrated in FIG. 9A.

In the present particular embodiment illustrated, the vertical-axis, main rotor shaft 190 is supported by the hanging bearing 200, which is supported by the cross-structure bearing support 205 disposed in the hanging bearing house 170. Similarly, the bearing 210 is supported by a cross-structure bearing support 215 (FIG. 2C). In one particular embodiment of the invention, the generator and control system 230, which controls the rotor 190, is contained in a generator housing 240 (FIGS. 4B, 10B) disposed in the lower bearing house 150. Additional bearings 191 (FIGS. 7C, 8A and 8B) may be provided at an interface where the shaft 190 passes through each slab of eductor floor 114, 116 (FIGS. 4B, 9A). A plurality of rotor-blade assemblies 195 are attached to the shaft 190, above each floor 114, 116 (and below the next floor 114 or roof 112).

The Rotor-Blade Assemblies:

The rotor-blade assemblies 195 are each configured with a plurality of blades arranged to engage the wind fluid stream in the neck 125 of the eductor wind channels. One rotor-blade assembly 195 is provided on the rotor 190 above each floor 114, 116 of the multi-floor eductor structure. In the example illustrated having twelve floors (one bottom floor 116 and eleven floors 114), there will be twelve rotor-blade assemblies mounted to the single, common rotor shaft 190, with one rotor-blade assembly 195 disposed in each eductor wind channel.

Figure 7A:
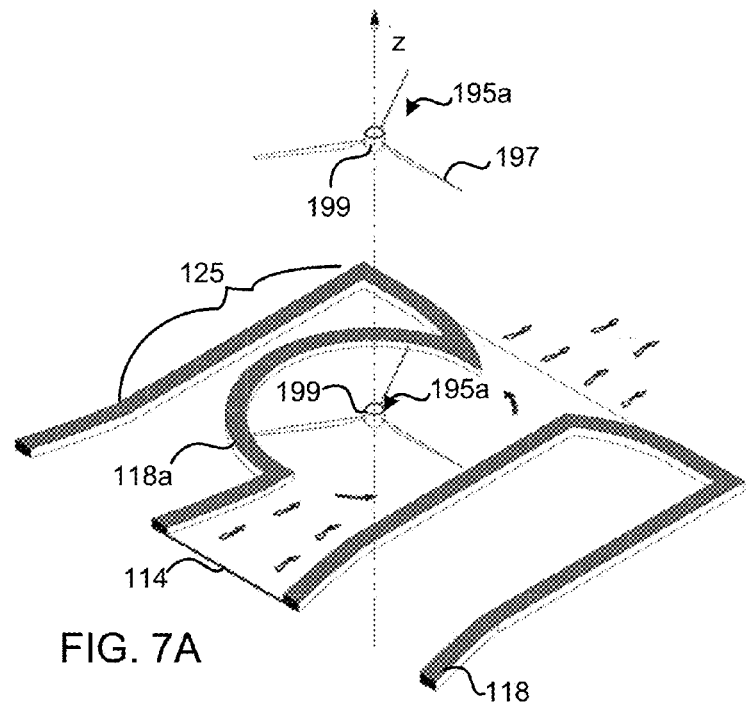
FIG. 7A is a partial perspective view of a section of the eductor useful in understanding the rotor-blade assembly in accordance with one embodiment of the invention.
Figure 7B:
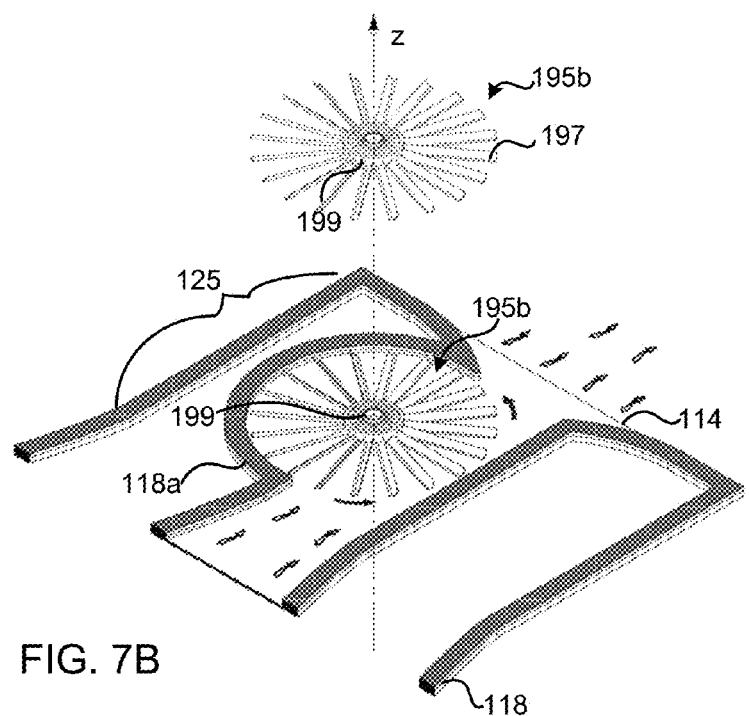
FIG. 7B is a partial perspective view of a section of the eductor useful in understanding the rotor-blade assembly in accordance with another embodiment of the invention.
Figure 7C:
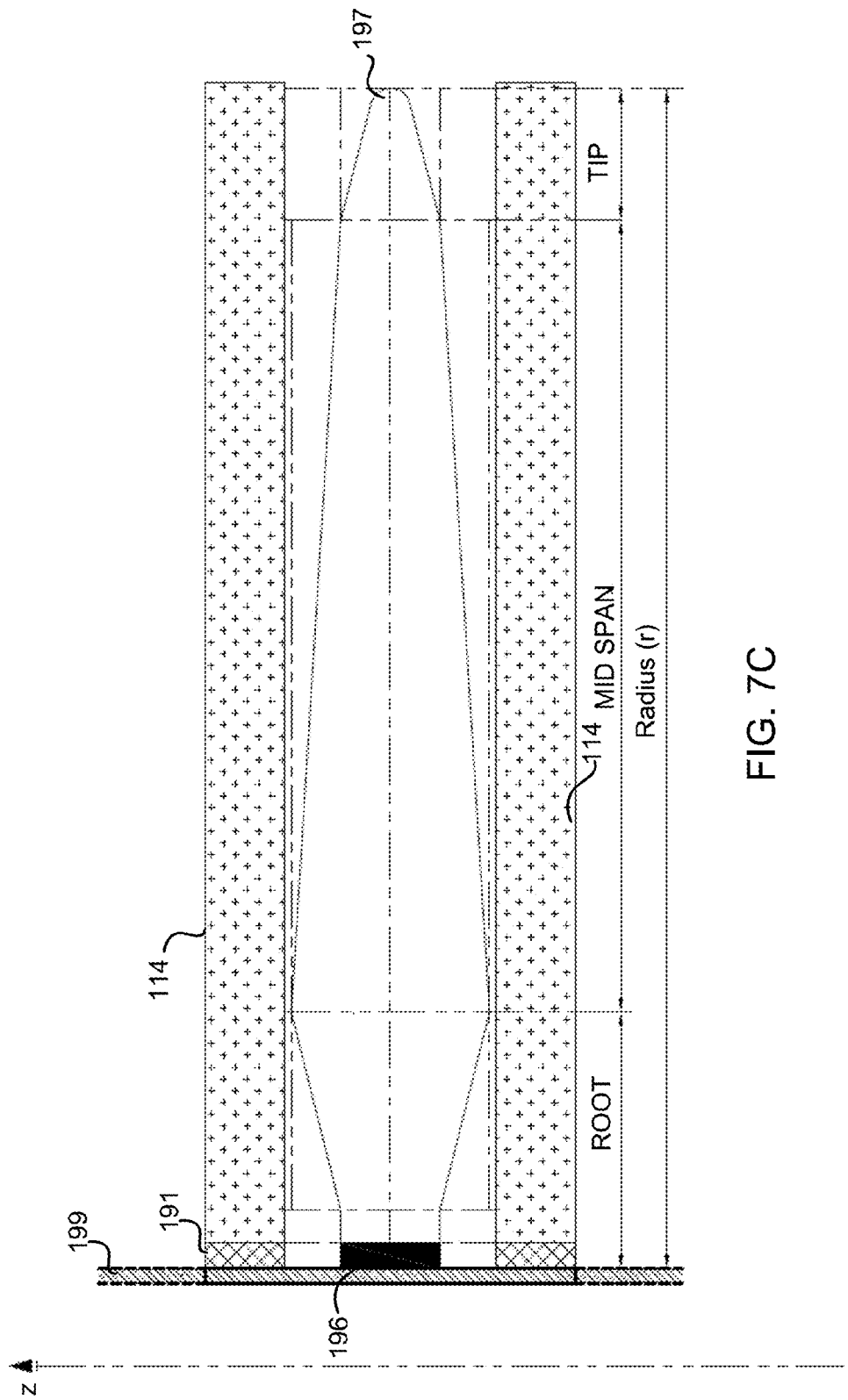
FIG. 7C is a side plan view of a rotor-blade according to one embodiment of the invention, in situ.
Figure 8A:
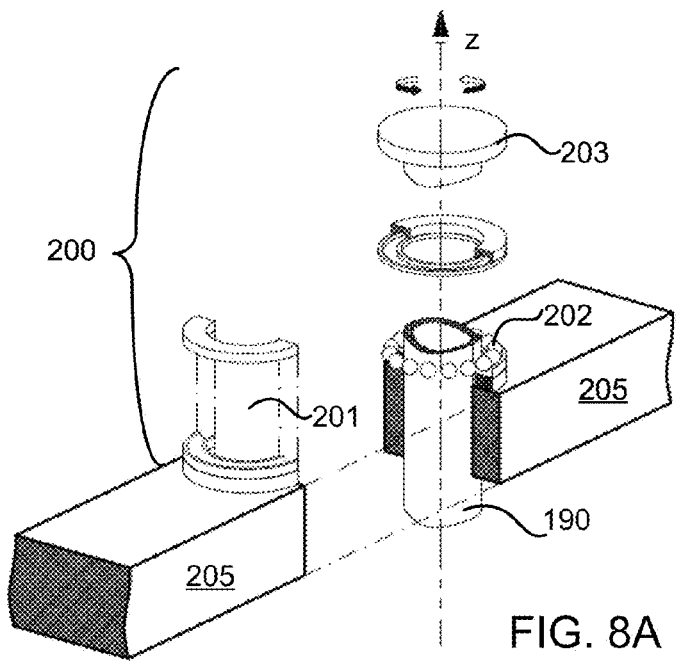
FIG. 8A is a partially exploded, partial, cut-away, perspective view of a portion of the hanging bearing and main rotor shaft in accordance with one particular embodiment of the invention.
Figure 8B:
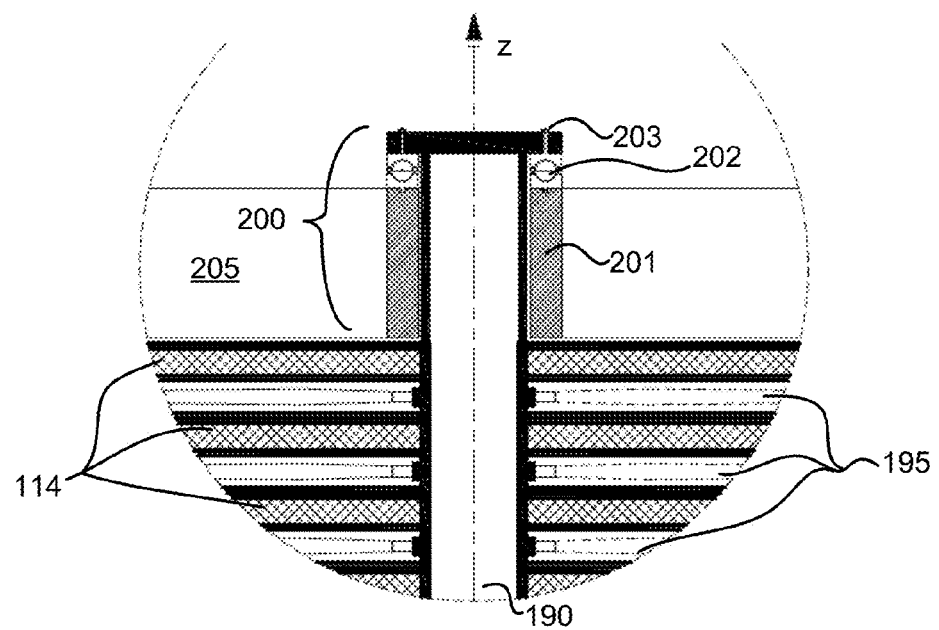
FIG. 8B is a partial, cut-away, plan view of a portion of the hanging bearing and main rotor shaft, in situ, in accordance with one particular embodiment of the invention.

FIGS. 7A and 7B illustrate two exemplary types of rotor blade assemblies 195*a* (FIGS. 7A, 7C), 195*b* (FIG. 7B), that can be used with the present invention. This is not meant to be limiting, as other rotor-blade assembly designs can be used without deviating from the scope and spirit of the present invention. However, the two rotor-blade assemblies 195*a*, 195*b* are designed for utilization in different ranges of operation. As illustrated more particularly in FIG. 7A, the rotor-blade assemblies 195*a* includes three blades in each rotary set. As illustrated in FIG. 7B, the rotor-blade assemblies 195*b* are made up of multiple axial-type blades connected to a central bearing or hub 199 (FIGS. 7A-7C). It should be noted that the drag and lift problems facing HAWT designers are absent here.

Each of the rotor-blade assemblies 195*a*, 195*b* include a plurality of rotor blades 197 attached to a central bearing or hub 199, which includes a cylindrical passage for receiving the rotor shaft 190. Each blade 197 is attached to the hub 199 via a mechanical blade fixation system 196 (FIG. 7C). In one particular embodiment of the invention illustrated in FIG. 7C, the blades 197 are directly bolted to the bearing 199, and are not able to pitch, thus avoiding aerodynamic stall above certain wind levels. As illustrated more particularly in FIG. 7C, the rotor-blades of the assemblies 195*a* each include a root, mid span and tip section. The blades 197 should be selected to be made of materials that can cope with fatigue and extreme temperatures.

In one particular embodiment, the blades 197 are optimally made from fiberglass-reinforced epoxy. Use of aluminum and composite materials contribute to low rotational inertia, which means that the turbine can accelerate quickly if the winds pick up, thus keeping the tip speed ratio more nearly constant. Glass fiber composites and carbon fiber composites have been studied by Montana State University. In one particular embodiment of the invention, depending on the system configuration and environmental extremities, materials for the blades 197 in the present eduction industrial power system can be aluminum, epoxy resin or glass fiber composite, as desired.

Figure 5A:
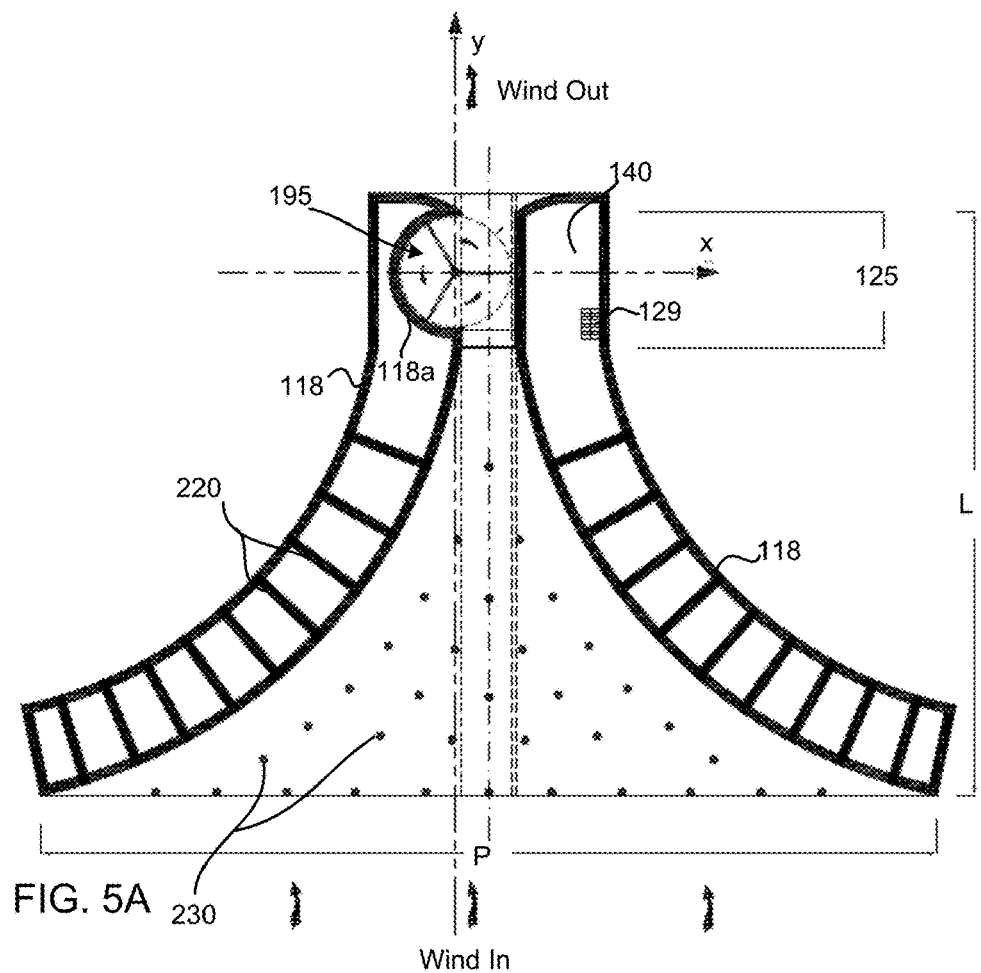
FIG. 5A is a top plan view of a portion of the eductor (having the roof removed) in accordance with one particular embodiment of the invention.
Figure 5B:
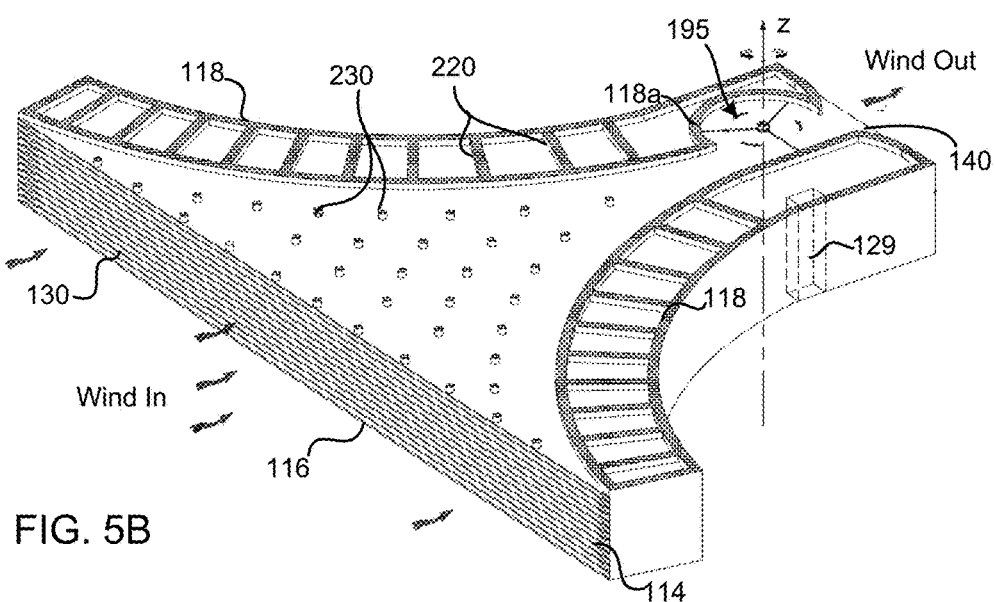
FIG. 5B is a perspective view, viewed from the front, of a portion of the eductor in accordance with one particular embodiment of the invention.
Figure 5C:
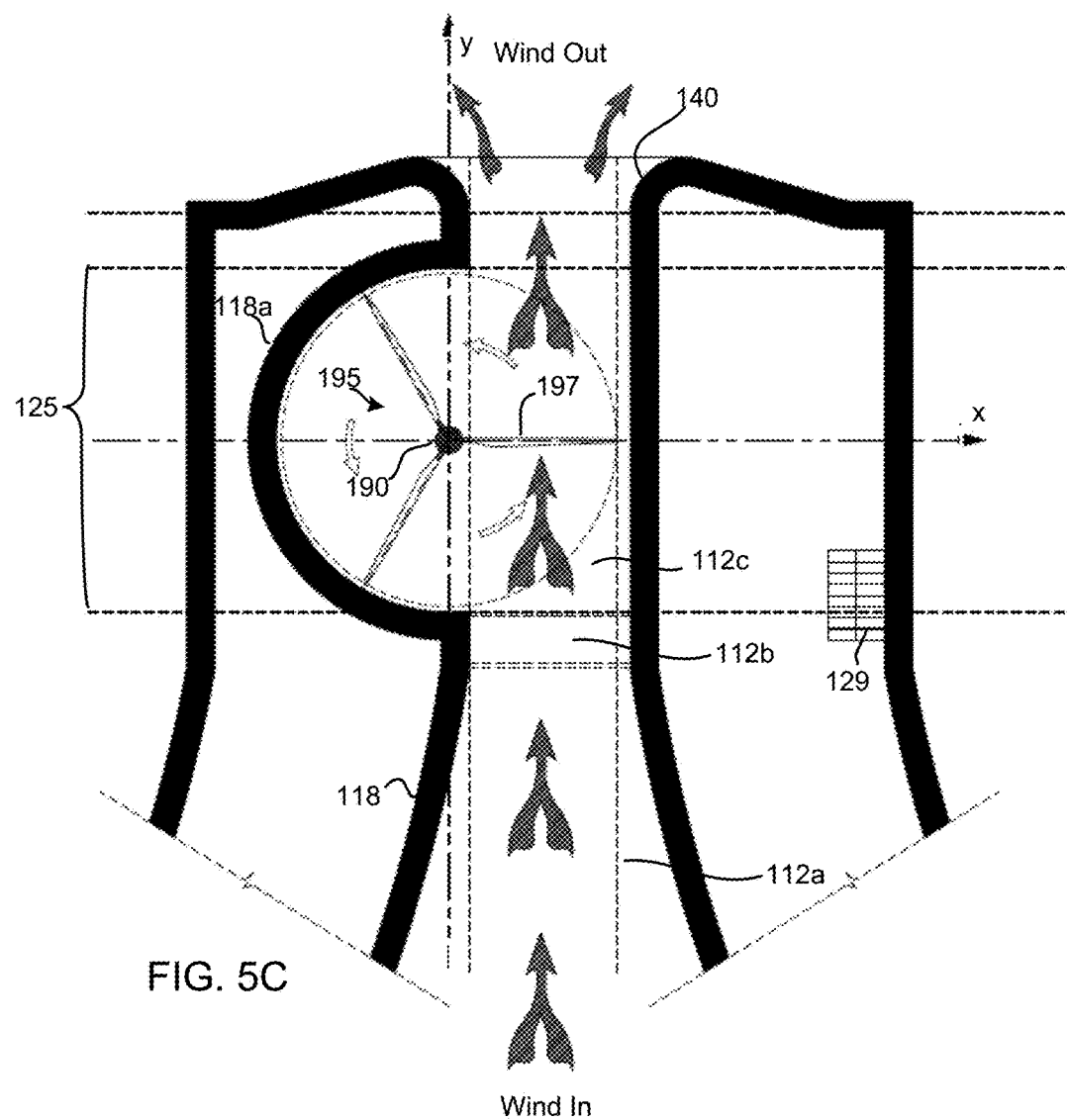
FIG. 5C is a top plan view of an enlarged partial section of an eductor wind channel showing a neck portion and rotor-blade assembly in accordance with one particular embodiment of the invention.
Figure 6:
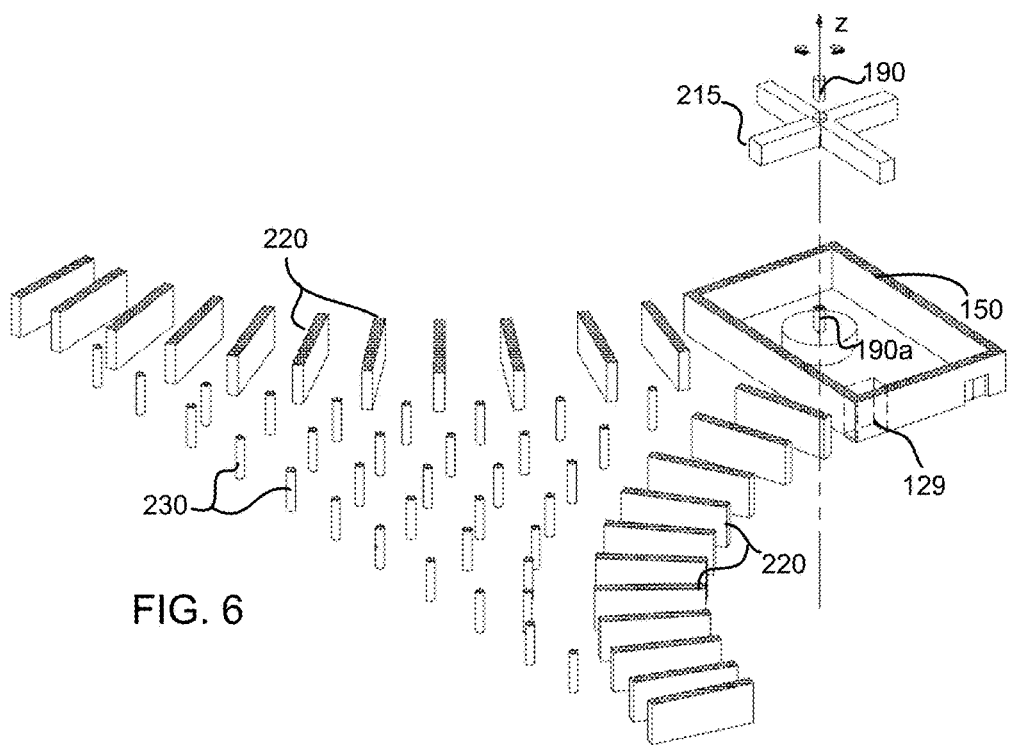
FIG. 6 is a partially exploded, perspective view, viewed from the front, of a portion of the ground level of a power plant in accordance with one particular embodiment of the invention.

The Eductor:

The eductor 110 is a multi-floor structure that permits wind to flow through the open spaces or channels between adjacent floors 114 of the eductor 110. The shape of the eductor 110 is configured to funnel the wind through the structure, accelerating it in the process. Wide at the air intake 130, the eductor narrows to a neck portion 125 integrated into the middle level 160 of the power plant house 120, between the hanging bearing house 170 and the lower bearing house 150. As illustrated in FIG. 5A, the width P of the eductor wind channel is greater than the length L of the eductor wind channel, in one particular embodiment.

The eductor 110 is defined vertically by the eductor roof 112 and eductor floor 116 and on the sides by the vertical walls or structures 118 (FIGS. 3A, 3B, 5A, 5B). The bottom eductor floor 116 (FIG. 4B) is raised above the ground 105 and defines the height of the lower bearing house level 150, in the power plant house 120. In one particular embodiment, the bottom eductor floor 116 is raised about 21 meters or five stories above the ground 105 (FIG. 4A).

The eductor floor 116 is supported above the ground 105 by a plurality of structural shear walls 220 (FIGS. 3A, 5B, 6) located at the side peripheries of the eductor 110 and integrated into the side structures 118. The side structures 118 have a concave curvature from the air intake 130 to the power plant house 120, as illustrated in FIG. 5A. Additionally, a plurality of columns 230 (FIGS. 3A, 5B, 6) support the eductor floor 116, and extend to support each floor 114, as well as the eductor roof 112. In the exemplary embodiment illustrated in FIG. 2B, twelve floors extend parallel to one another from the air intake 130 to the power plant house 120, between the bottom eductor floor 116 and the eductor roof 112. The spaces between the adjacent eductor levels 112, 114 and 116 and the side structures 118 serve as the wind flow channels through the eductor 110. For purposes of the present application, the flow paths between adjacent floors, or between the topmost floor 114 and the eductor roof 112 will be referred to herein as eductor wind channels. In the present preferred embodiment, one rotor-blade assembly is disposed in the neck of each eductor wind channel, above each eductor floor 114, 116.

Figure 3C:
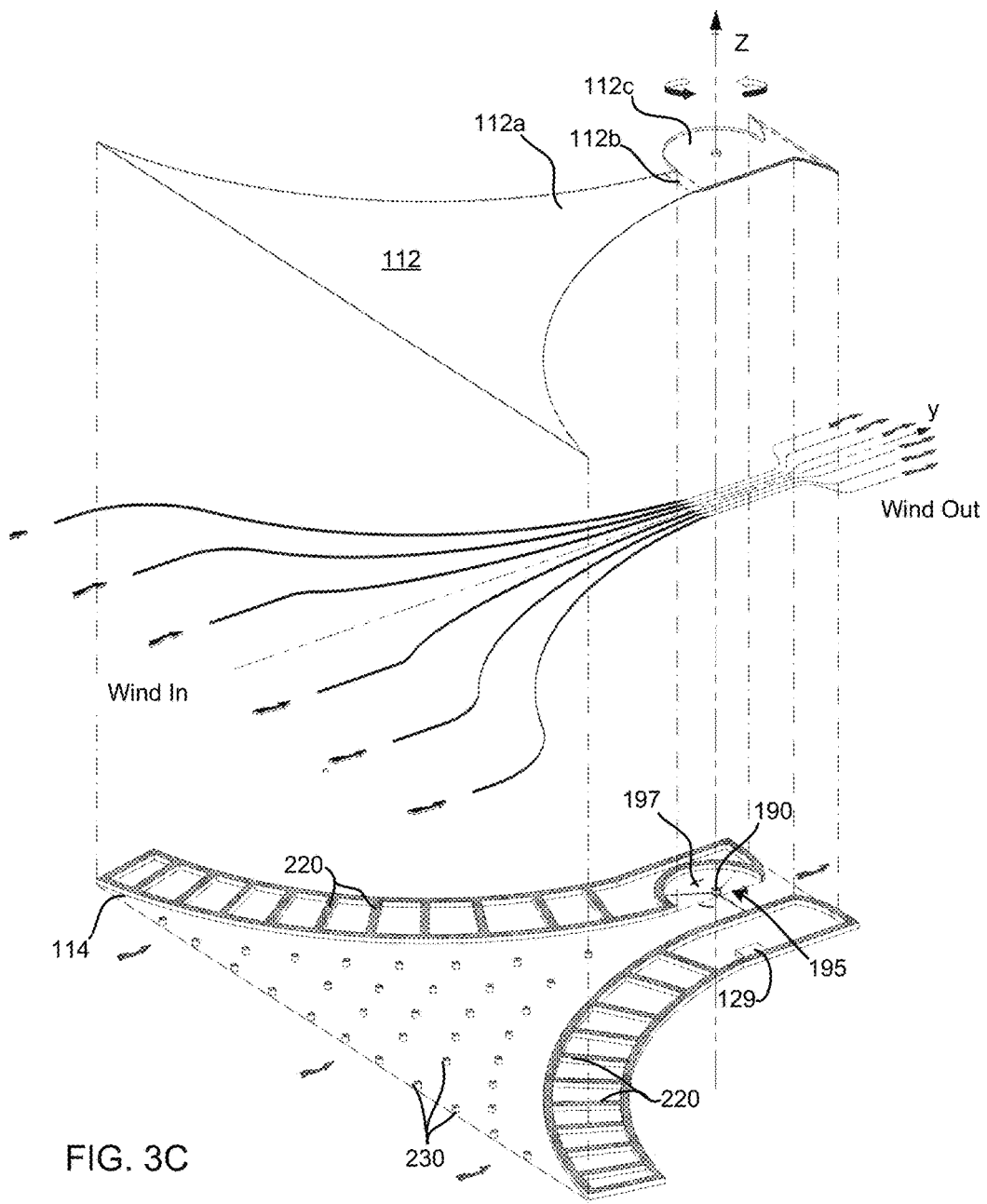
FIG. 3C is an exploded view of a section of an eductor in accordance with one particular embodiment of the invention, showing the top floor and roof of the eductor.

The eductor 110 is broad at the air intake 130, but narrows at the neck 125, contained in the eductor house 160. The neck 125 defines the narrowest width portion (i.e., along the x-axis) of each eductor wind channel (FIG. 5A). Additionally, in one particular preferred embodiment of the invention, each eductor wind channel is further constricted in the neck 125 by reducing the ceiling height approaching the neck 125, resulting in a low ceiling height area 112*c* (FIGS. 4A-4C) proximal to each rotor blade assembly 195, as illustrated more particularly, in FIGS. 2C, 3C and 4A-4C. More particularly, a first portion 112*a* (FIGS. 3C, 4B) of the roof 112 or of a lower surface of a floor 114 has a first, standard height. Approaching the neck 125 of the eductor wind channel, the ceiling height is reduced or tapered in an area 112b (FIGS. 3C, 4B). A low ceiling height area 112c (FIGS. 3C, 4B) is provided in the neck 125 of the presently described embodiment, over the recess 118a (FIG. 5A) and adjacent to the rotor-blade assembly 195, in order to further constrict the air flow channel through the neck 125 to compress and accelerate the wind passing through the channel at this point. In other words, the wind intake 130 permits a higher volume of wind to enter than the wind outlet 140 permits to leave at one time, causing the wind to exit at a much greater velocity than it entered the eductor.

A semi-circular recess 118a (FIG. 5A) formed in a structure 118 forming one side of the eductor neck 125 is configured to receive a rotor-blade assembly 195 mounted on the vertical, main rotor shaft 190. The recess 118a is sized to expose at least one rotor blade 197 of the rotor-blade assembly 195 to wind flow through the neck 125, in use, and to accommodate rotation of the rotor-blade assembly 195 on the shaft 190. As illustrated more particularly in FIG. 5C, in one embodiment, air exerts direct torque onto the length of the impeller only, thus avoiding back-torque when air coasting the blade 197. As will be apparent, the recesses 118a formed in each eductor wind channel are aligned to permit the use of multiple rotor-blade assemblies 195 on a single vertical, main rotor shaft 190.

Consequently, in use, low speed wind enters each eductor wind channel (i.e., between the bottom floor 116 and the next adjacent floor 114; between each two adjacent floors 114; and between the topmost floor 114 and the bottom face of the eductor roof 112) via the air intake 130, which forms the widest part of each eductor wind channel. As the diameter (i.e., x-axis) and, if desired, the height (i.e., along the vertical z-axis) of each eductor wind channel progressively decreases, the speed of the wind in each eductor wind channel increases until the wind reaching the neck is traveling at a high velocity. The high velocity wind in each channel causes the rotor-blade assembly 195 in that channel to rotate, thus causing the main rotor to turn, as indicated by the directional arrows in FIG. 2A. High velocity wind will then exit the eductor wind channels via the air outlet 140, just beyond the rotor-blade assemblies 195.

The Eductor House:

As discussed above, the multi-floor eductor house 160 forms the middle part of the power plant house 120. The eductor neck 125 portion of the eductor 110 makes up a large part of the eductor house 160. Wind passing through the eductor house 160 (i.e., along the y-axis through the power plant 100) exits the channels at the wind outlet 140, at the rear (based on the direction of airflow) of the eductor house 160. The house 160 can be configured to extend beyond the structural walls 118 of the eductor neck, which provides regions 165 (FIG. 2C) in the house 160, on either side of the eductor neck 125. The regions 165 can be used for storage, mechanical access, ventilation, elevator shafts, etc., as desired. Similar regions can be provided in the bearing housings 150 and 170, as illustrated. The rotor-blade assemblies 195 are disposed on the rotor 190 in the eductor house 160.

The Lower Bearing House:

The lower bearing house 150 is the ground level of the power plant house 120 and includes the lower main shaft bearing 210, cross-structure bearing support 215 and generator control system 230. In one particular embodiment, the height of the lower bearing house is approximately 21 meters above the ground 105, or about five stories up in the power plant house 120. The lower bearing house 150 includes a portion of the vertical-axis, main rotor shaft 190, connected to the lower bearing 210. A further portion of the vertical-axis, main rotor shaft 190 acts is connected to the transmission shaft 190a (FIG. 2D, 10C) of the generator 250. The generator and control system 230 is additionally contained within the lower bearing house 150.

Figure 10B:
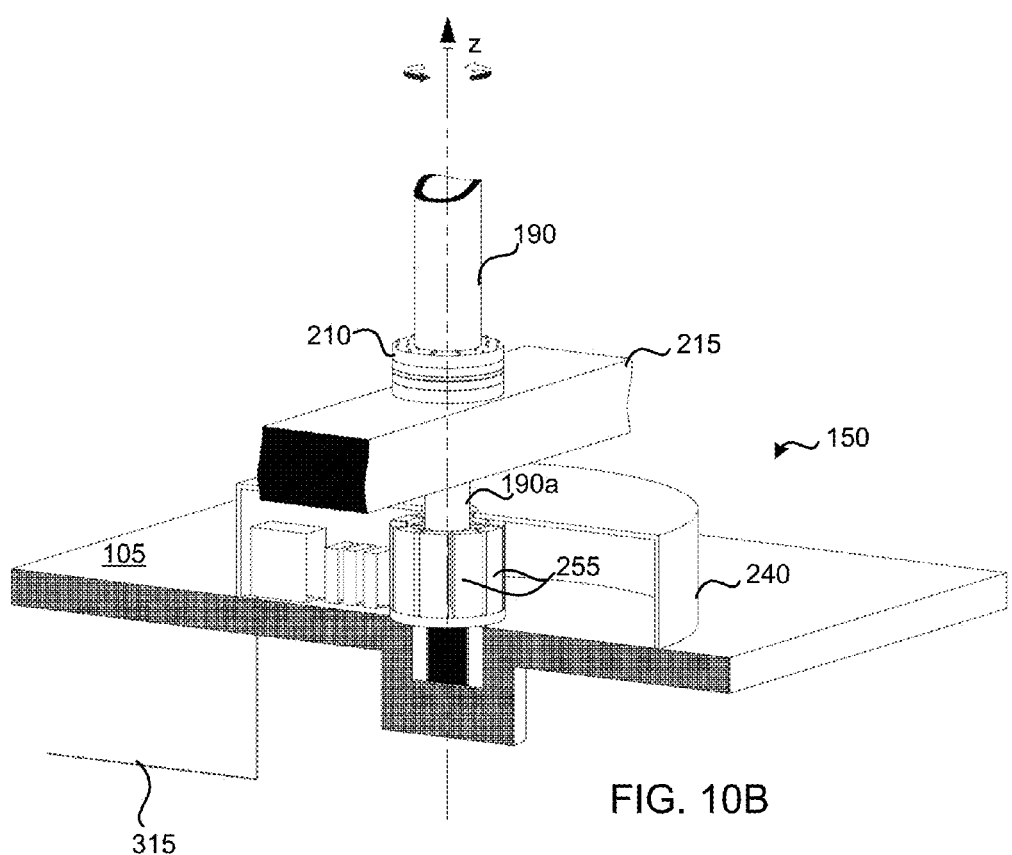
FIG. 10B is a partial, cut-away, perspective view of a portion of the rotor hub and generator in accordance with one particular embodiment of the invention.
Figure 10C:
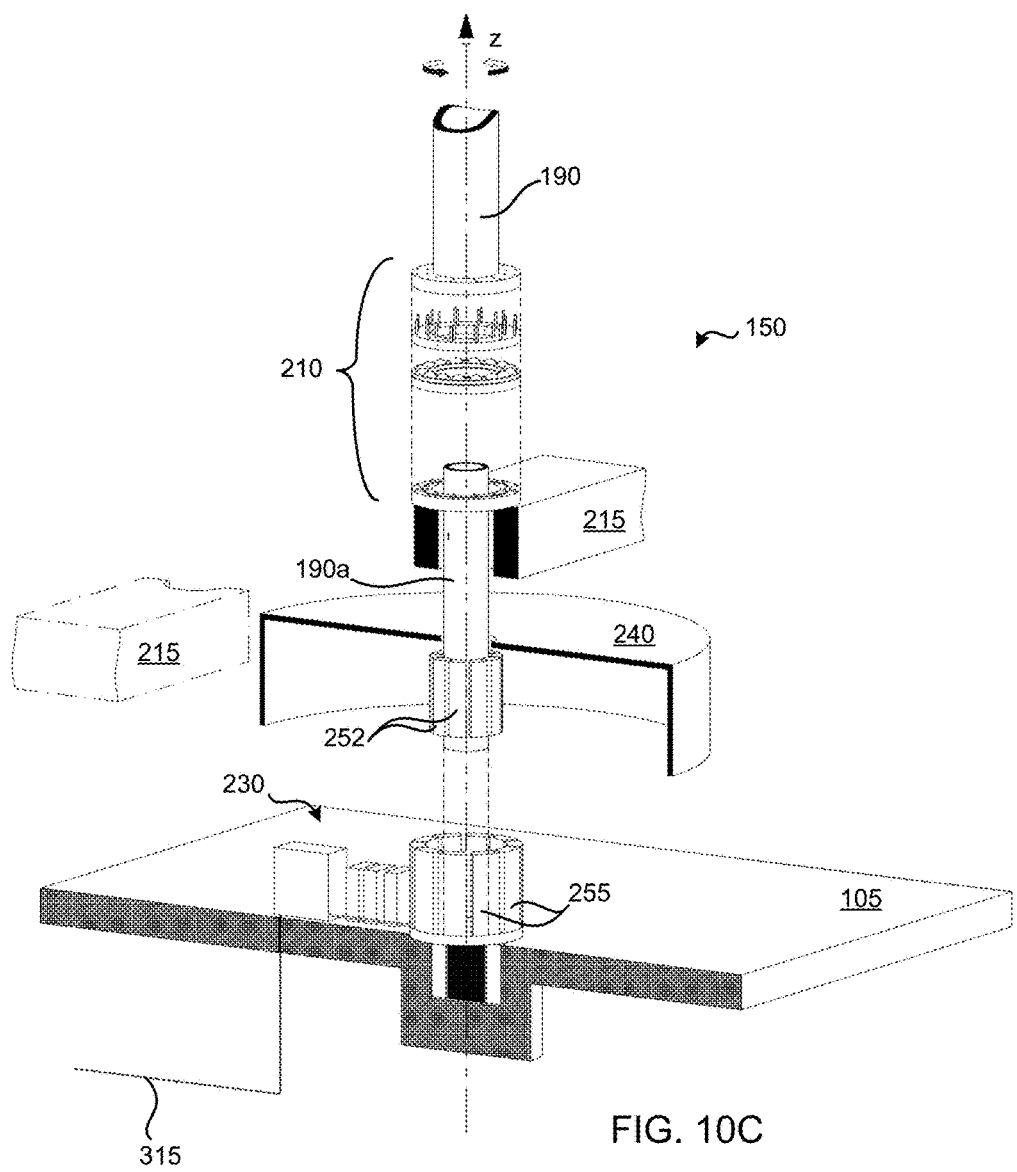
FIG. 10C is a partially exploded, partial, cut-away, perspective view of a portion of the rotor hub and generator in accordance with one particular embodiment of the invention.

The Generator and Control System:

Referring more particularly to FIGS. 10A-10C, the generator and control system 230 is provided in the generator housing 240 disposed in the lower bearing house 150 and includes the generator 250, control systems 260 (FIG. 10A) and battery systems 270 (FIG. 10A), among other components. Power generated by the system 230 can be output via AC electrical lines 320 (FIG. 10A) to the local electrical grid, or may be used locally to power different applications, as desired.

The power generator 250, in the present embodiment, is configured as an alternator including a plurality of directly connected, permanent magnets 252 disposed on the transmission shaft 190a, and no gear box. In the present, alternator embodiment, the magnets 252 are disposed proximal to a fixed set of magnets 255, as illustrated more particularly in FIG. 10C. Advantageously, such a generator can handle cold weather and extreme conditions. In one particular embodiment of the invention, the power generator 250 is designed based on a doubly fed induction system to match output frequency and voltage with the values of the local electrical grid. Additionally, in the present preferred embodiment, the permanent magnets of the generator 250 are brushless, with no commutator, thus require practically no maintenance.

As illustrated more particularly in FIG. 10A, the generator 250 provides a DC output voltage to an input of an inverter 290, which, in turn, provides an AC voltage output to the main utility breaker panel 300 for the plant 100 and/or to the battery storage systems 270, as desired. The main utility breaker panel an AC utility meter 310 (FIG. 10A). The AC utility meter 310 is connected to AC power lines 320 via an electrical cable 315 (FIG. 10A). Energy generated at the power plant 100 can be fed back into the grid via these AC power lines 320.

The control system 260 (FIG. 10A) includes, among other things, sensors to measure process variables, actuators to manipulate energy capture and component loading and control algorithms to coordinate the actuators based on information gathered by the sensors. The control system 260, thus, includes a processing device, such as a microprocessor or microcontroller, configured by software stored in non-transitory memory of the control system 260, to perform the control tasks for the system based on the gathered information and a set of rules defined in the algorithm or software.

One control task performed by the control system 260 is the actuation of a hydraulically-driven mechanical brake 280 (FIG. 10A) connected to the control system 260. In the present preferred embodiment, the brake 280 is a secondary means to hold the turbine at rest for maintenance. A rotor lock system, not shown, is provided as the primary means for holding the turbine at rest. In one particular embodiment of the invention, the brake 280 will activate only after the primary braking has reduced the turbine speed.

The eduction industrial power system of the present invention is the first major industrial VAWT power plant that provides huge advantages over the current, main-stream HAWT systems. More particularly, a power plant.

Inducted air flows through the single length of a blade, thus avoiding torque when blade coasting air flow. This solves one of the main persistent problems facing VAWT designs in the past. Additionally, an eduction industrial power system system in accordance with the present invention can withstand much higher speed than HAWT systems, which have to be shut down at near 55 MPH wind speeds.

A direct-connect, variable high-speed, vertical generator technology, according to the invention, is a major innovation to the configurations techniques of wind power generation. While HAWT systems require installation of tons of equipment at a high elevation to rotate only one set of rotor/blade, multi-stage rotor/blade combination allows multi-level rotor/blade installation, thus multiplying power output within an individual system.

Further, elimination of gear boxes, yaw controls and related ancillary systems results in substantial cost saving and maintenance burdens. Operation room (generator, control room, power switches, voltage regulation system, etc) is placed on the ground level, thus resulting in construction and maintenance cost savings, as well as ease of operation.

Additionally, much wider choices of location selection are available, due to low land space requirement and being able to operate at low-speed wind. An eduction industrial power system and power plant buildings according to the present invention can blend well with the surroundings from esthetic point of view. Thus, all in all, an eduction industrial power system, according to the present invention, is a revolutionary system which will change the overall approach to an inefficient path followed up to now in the wind turbine utilization.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended. For example, an eduction industrial power system according to the present invention can be designed for various capacities and situations through: variation of eductor system parameters and dimensions; changing the number of floors and stages of blade/rotor assemblies; and adapting architectural aspects to suit local conditions and environmental aspects.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

I claim:

1. A power plant, comprising
    a power plant house defined by an upper bearing house, an eductor house below the upper bearing house and a lower bearing house below the eductor house;
    a multi-floor eductor integrated with said power plant house, and extending from and beyond said power plant house, the multi-floor eductor including a wide wind intake distal from said power plant house, said wide wind intake being at least two times the width of said power plant house, and a narrower wind outlet disposed through a face of said power plant house distal from said wide wind intake, a constricted neck portion contained in said eductor house, each space between two adjacent floors of said multi-floor eductor and between two vertical side walls fixed to each floor for the length of the floor defining a wind channel, said floors outside said power plant house being parallel to one another;
    a plurality of rotor-blade assemblies supported in said constricted neck portion of said multi-floor eductor between said wind intake and said wind outlet on the same, single, vertical-axis main rotor shaft, with each rotor-blade assembly of said plurality separated vertically from at least one other rotor-blade assembly by a floor of said multi-floor eductor; and
    a generator vertically aligned with and directly connected to the vertical-axis main rotor shaft for generating power when said single main rotor shaft rotates.

2. The power plant of claim 1, wherein said wind intake of said multi-floor eductor structure has a greater fluid flow volume than said wind outlet.

3. The power plant of claim 1, wherein a width of said wind intake of said multi-floor eductor is greater than a distance between said wind intake and said wind outlet.

4. The power plant of claim 1, wherein the wind intake of said multi-floor eductor has a greater height than said wind outlet.

5. The power plant of claim 1, wherein each channel of said multi-floor eductor tapers in at least one of height and width from the wind inlet to said constricted neck portion in said eductor house, each rotor-blade assembly being disposed in said constricted neck portion.

6. The power plant of claim 5, wherein each rotor-blade assembly is disposed in a semi-circular recess formed in a sidewall of each channel.

7. The power plant of claim 5, wherein each rotor-blade assembly includes a plurality of rotor-blades fixed to a hub bearing disposed in said channel on said single, vertical-axis main rotor shaft.

8. The power plant of claim 1, wherein said power plant house contains the single, vertical-axis main rotor shaft supported towards a top of said power plant house by a hanging bearing in said upper bearing house.

9. The power plant of claim 8, wherein said single, vertical-axis main rotor shaft is supported at an end distal from said hanging bearing by a lower bearing contained in said lower bearing house of said power plant house.

10. The power plant of claim 9, wherein said hanging bearing and said lower bearing are arranged relative to said single, vertical-axis main rotor shaft in a locating/non-locating bearing arrangement.

11. The power plant of claim 8, wherein a lowest floor of said multi-floor eductor outside said power plant house is raised above ground level by at least one of columns and shear walls.

12. The power plant of claim 11, wherein said lowest floor of said multi-floor eductor is at least five stories above ground level.

13. The power plant of claim 1, wherein said power generator includes a plurality of magnets that are rotated when said single, vertical-axis main rotor shaft rotates.

14. The power plant of claim 13, wherein said power generator includes a magnetic alternator.

15. The power plant of claim 1, further comprising a control system for controlling: the rotation of the single, vertical-axis main rotor shaft; the generation of electricity by rotation of the single, vertical-axis main rotor shaft; and storage or distribution of the electricity generated.

16. An eduction industrial power system comprising:
    a plurality of power plants according to claim 1;

each of said plurality of power plants tied to an electrical power grid to provide power generated by said power plant to said power grid.

17. A method of providing electricity, comprising the steps of:
providing a power plant according to claim 1;
controlling the production of energy from said power plant using a control system; and
at least one of:
storing electricity generated by said power plant in a battery at said power plant; and
distributing energy generated by said power plant across power lines to an electrical grid.

18. The method of claim 17, wherein adjacent floors of the multi-floor eductor define a wind channel there between, and each channel of the multi-floor eductor tapers in at least one of height and width from the wind inlet to the constricted neck portion proximal to said wind outlet, each rotor-blade assembly being disposed in the constricted neck portion.

19. The power plant of claim 1, wherein the side walls defining each wind channel are concave from the wind intake to the power plant house.

20. A method of building a power plant, comprising the steps of:
building a power plant house defined by an upper bearing house, an eductor house below the upper bearing house and a lower bearing house below the eductor house and a multi-floor eductor integrated with said power plant house, and extending from and beyond said power plant house, the multi-floor eductor including a wide wind intake distal from said power plant house, said wide wind intake being at least two times the width of said power plant house, and a narrower wind outlet disposed through a face of said power plant house distal from said wide wind intake, a constricted neck portion contained in said eductor house, each space between two adjacent floors of said multi-floor eductor and between two vertical side walls fixed to each floor for the length of the floor defining a wind channel, the floors outside said power plant house being parallel to one another, said wind intake positioned to receive incoming wind;
positioning a plurality of rotor-blade assemblies in said multi-floor eductor between said wind intake and said wind outlet, each of said plurality of rotor-blade assemblies being positioned on the same, single, vertical-axis main rotor shaft, with only one rotor-blade assembly being positioned on said shaft per floor of said multi-floor eductor, with each rotor-blade assembly of the plurality separated vertically from at least one other rotor-blade assembly by a floor of said multi-floor eductor; and
providing a generator vertically aligned with and directly connected to the vertical-axis main rotor shaft for generating power when said single main rotor shaft rotates.

21. The method of claim 20, wherein said building step includes tapering at least one of height and width of each channel of the multi-floor eductor from the wind inlet to the constricted neck portion proximal to said wind outlet, each rotor-blade assembly being disposed in said constricted neck portion.

\* \* \* \* \*